US006576713B2

(12) United States Patent
Ishizaki et al.

(10) Patent No.: US 6,576,713 B2
(45) Date of Patent: Jun. 10, 2003

(54) WATER-ABSORBENT RESIN POWDER AND PRODUCTION PROCESS THEREFOR

(75) Inventors: Kunihiko Ishizaki, Suita (JP);
Teruyuki Kanto, Himeji (JP);
Nobuyuki Harada, Suita (JP); Takumi Hatsuda, Takasago (JP); Shinichi Fujino, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 128 days.

(21) Appl. No.: 09/789,735

(22) Filed: Feb. 22, 2001

(65) Prior Publication Data

US 2001/0025093 A1 Sep. 27, 2001

(30) Foreign Application Priority Data

Feb. 29, 2000 (JP) ........................................ 2000-052808
Sep. 11, 2000 (JP) ........................................ 2000-243951

(51) Int. Cl.$^7$ ..................... C08F 220/62; C08F 220/10; C08C 19/00
(52) U.S. Cl. ............... 525/329.7; 525/330.3; 525/384; 521/64; 428/402
(58) Field of Search ................ 428/402; 525/329.7, 525/330.1, 384; 521/64

(56) References Cited

U.S. PATENT DOCUMENTS

| | | | | |
|---|---|---|---|---|
| 4,920,202 A | 4/1990 | Irie et al. | ..................... | 528/500 |
| 4,950,692 A | 8/1990 | Lewis et al. | ..................... | 521/45 |
| 4,985,518 A | 1/1991 | Alexander et al. | ........... | 526/240 |
| 5,005,771 A | 4/1991 | Pieh et al. | ..................... | 241/23 |
| 5,061,259 A | 10/1991 | Goldman et al. | ............ | 604/368 |
| 5,064,582 A | 11/1991 | Sutton et al. | ................... | 264/37 |
| 5,075,344 A | 12/1991 | Johnson | ...................... | 521/140 |
| 5,275,773 A | 1/1994 | Irie et al. | ...................... | 264/141 |
| 5,342,899 A | 8/1994 | Graham et al. | .............. | 525/301 |
| 5,369,148 A | 11/1994 | Takahashi et al. | ........... | 523/315 |
| 5,385,983 A | 1/1995 | Graham | .................... | 525/330.1 |
| 5,409,771 A | 4/1995 | Dahmen et al. | ............. | 428/327 |
| 5,422,405 A | 6/1995 | Dairoku et al. | .............. | 525/384 |
| 5,597,873 A | 1/1997 | Chambers et al. | ........ | 525/330.1 |
| 5,981,070 A | 11/1999 | Ishizaki et al. | ............... | 428/402 |
| 5,985,944 A * | 11/1999 | Ishizaki et al. | ............... | 521/64 |
| 6,071,976 A | 6/2000 | Dairoku et al. | ................ | 521/50 |
| 6,228,930 B1 * | 5/2001 | Dairoku et al. | ............... | 524/500 |
| 6,254,990 B1 * | 7/2001 | Ishizaki et al. | ............. | 428/402 |
| 6,388,000 B1 * | 5/2002 | Irie et al. | ..................... | 524/556 |

FOREIGN PATENT DOCUMENTS

| | | | |
|---|---|---|---|
| EP | 0450923 | | 10/1991 |
| EP | 0855232 | | 7/1998 |
| EP | 0922717 | | 6/1999 |
| EP | 0926162 | | 6/1999 |
| EP | 0 937 739 | A2 | 8/1999 |
| EP | 0948997 | | 10/1999 |
| EP | 0955086 | | 11/1999 |
| EP | 1002806 | | 5/2000 |
| EP | 1029886 | | 8/2000 |
| JP | 5453165 | | 4/1979 |
| JP | 03196145 | * | 8/1991 |
| JP | 7224204 | | 8/1995 |
| JP | 7242709 | | 9/1995 |
| JP | 7270070 | | 10/1995 |
| JP | 873518 | | 3/1996 |
| WO | 9942494 | | 8/1999 |
| WO | 9942496 | | 8/1999 |
| WO | 9943720 | | 9/1999 |
| WO | 0022017 | | 4/2000 |
| WO | 0022018 | | 4/2000 |
| WO | 0024810 | | 5/2000 |
| WO | 0046260 | | 8/2000 |

* cited by examiner

Primary Examiner—Tatyana Zalukaeva
(74) Attorney, Agent, or Firm—Roylance, Abrams, Berdo & Goodman, L.L.P.

(57) ABSTRACT

The present invention provides a production process for a water-absorbent resin powder which is excellent in particle diameter distribution and properties, wherein the production process not only inhibits adhesion and aggregation in the production steps, but also is excellent in energy efficiency, drying efficiency, and productivity. The production process for a water-absorbent resin powder comprises the steps of: polymerizing an aqueous monomer solution containing a crosslinking agent; heat-drying the resultant crosslinked hydrogel polymer; and pulverizing the resultant dry polymer; wherein: the dry polymer resultant from the heat-drying step is forcibly cooled before or during the pulverization step; and the water-absorbent resin powder has an average particle diameter of 200 to 600 μm after the pulverization step wherein the total ratio of particles having particle diameters of not larger than 150 μm and particles having particle diameters of not smaller than 850 μm in the water-absorbent resin powder is not more than 15 weight % of the water-absorbent resin powder.

29 Claims, 1 Drawing Sheet

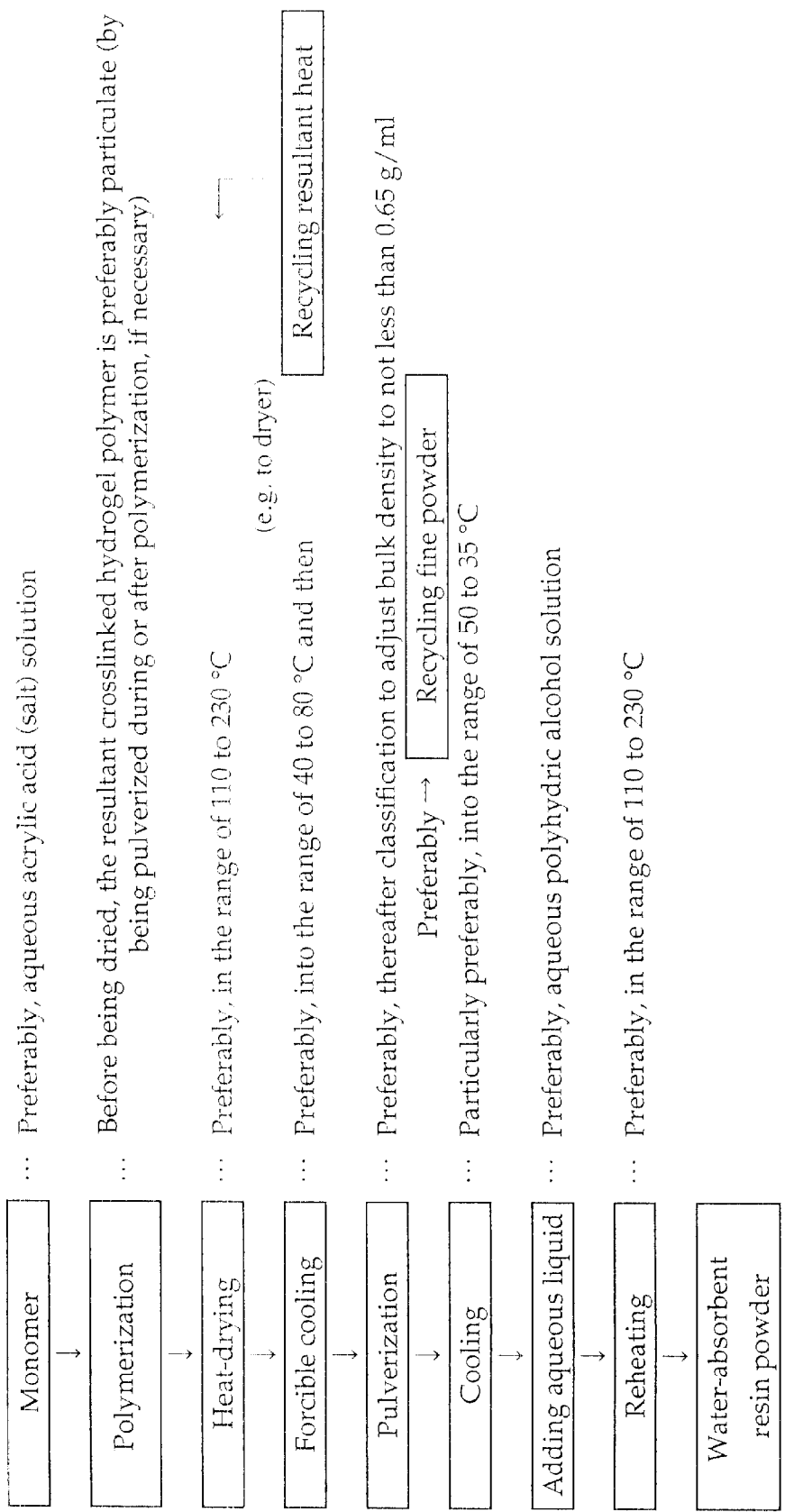
Fig. 1  Representative example of process according to present invention
(However, the invention is not limited to this example)

WATER-ABSORBENT RESIN POWDER AND PRODUCTION PROCESS THEREFOR

BACKGROUND OF THE INVENTION

A. Technical Field

The present invention relates to a water-absorbent resin powder and a production process therefor. More specifically, the present invention relates to a production process for a water-absorbent resin powder which is excellent in particle diameter distribution and properties, wherein the production process not only inhibits adhesion and aggregation in the production steps, but also is excellent in energy efficiency, drying efficiency, and productivity.

Furthermore, the present invention relates to a process for obtaining a water-absorbent resin powder as modified by adding an aqueous liquid to the resultant powder, which process is to more improve properties of the water-absorbent resin powder by bettering the uniform mixability of the aqueous liquid even if a special mixer or organic solvent is not especially used.

B. Background Art

In recent years, water-absorbent resins are widely used as components of sanitary materials, such as disposable diapers, sanitary napkins and incontinent pads, for the purpose of causing the water-absorbent resins to absorb much water. In addition, the water-absorbent resins are widely used not only for the sanitary materials, but also for the purpose of absorbing or retaining water, like water-retaining agents for soil and drip sheets for foods.

As to the above water-absorbent resins, the following are known as their examples: partially-neutralized and crosslinked poly(acrylic acids); hydrolyzed copolymers of starch-acrylonitrile; neutralized graft polymers of starch-acrylic acid; saponified copolymers of vinyl acetate-acrylic acid ester; hydrolyzed copolymers of acrylonitrile or acrylamide, or crosslinked polymers of these hydrolyzed copolymers; crosslinked polymers of carboxymethyl cellulose; crosslinked copolymers of 2-acrylamido-2-methylpropanesulfonic acid (AMPS); crosslinked poly (ethylene oxide); crosslinked polyallylamine; and crosslinked polyethylenimine. Many of them are used as powders.

The mainstream of production processes for these water-absorbent resins is a process comprising the steps of: polymerizing an aqueous monomer solution (containing a crosslinking agent, if necessary); and drying the resultant crosslinked hydrogel polymer; and further, if necessary, pulverizing the resultant dry polymer; thus obtaining a water-absorbent resin as a powder. However, because of high absorbency, tackiness, and adhesion, and inferior heat resistance, the crosslinked hydrogel polymer of the water-absorbent resin has disadvantages in that: drying and pulverizing thereafter are very difficult, the productivity is low, and the properties of the resultant water-absorbent resin and the energy efficiency are very bad.

Known examples of methods for drying such a crosslinked hydrogel polymer of the water-absorbent resin include: drying with a drum dryer (JP-A-053165/1979); a method in which a dry powdery acrylic acid polymer and a hydrogel are mixed together and then dried while being stirred (JP-A-117551/1982); azeotropic dehydration (JP-A-198714/1982); drying at a specific dew point (JP-A-026604/1989/U.S. Pat. No. 4,920,202); freeze-drying (JP-A-304127/1989, JP-A-304128/1989); a method which involves stir-drying in a cylindrical dryer (JP-A-240112/1990/U.S. Pat. No. 5,005,771); a method in which a gel is extruded through specific apertures and then dried (U.S. Pat. No. 5,275,773); microwave drying (JP-A-209010/1993/U.S. Pat. No. 5,075,344); a method which involves the use of a specific gel cutter followed by hot-wind drying (JP-A-230124/1993); a method which involves hot-wind drying while measuring the differential pressure (JP-A-073518/1996); a method which involves stir-drying after adding a surfactant (JP-A-134134/1996); and a method which involves static drying, and then pulverizing, and then stirring or fluidize-drying (JP-A-240914/1999/EP 0926162).

In addition, a drying method in which the crosslinked hydrogel polymer is dried in a state laminated on a punching metal or a metal gauze is known. However, after being dried, the resultant dry polymer displays bad releasability to adhere to or clog the metal gauze or the apertures, therefore particularly the hot-wind drying etc. have problems of much deterioration of the drying efficiency involved by deterioration of permeability. Thus, a method is also known in which method a special conveyer having pins is used for the purpose of inhibiting such adhesion and clogging (JP-A-270070/1995/DE 19511769).

Furthermore, besides properties (such as water absorption capacity, water-extractable content, and liquid permeability), the particle diameter distribution is important for the water-absorbent resin, and the importance of water-absorbent resins having specific narrow particle diameter distributions is also known (JP-A-132802/1989/U.S. Pat. No. 5,061,259, JP-A-196802/1990/U.S. Pat. No. 5,244,735, JP-A-191604/1990/U.S. Pat. No. 4,973,632, JP-A-507564/1994/U.S. Pat. No. 5,419,956, and EP 0629411). In addition, a water-absorbent resin having a plurality of particle diameter distributions is also known (EP 0845272 and JP-A-130978/1999).

Thus, efficient classification is demanded as a classification method for such an aimed particle diameter adjustment, and the following methods are also known as methods for classifying water-absorbent resins after drying them: a method which involves the use of a heated or heat-retained sieve (JP-A-202187/1998/EP 0855232); and a method which involves the use of a classifying gauze as coated with such as Teflon (JP-A-156299/1999). Also known is a method in which an undried product from the drying step is classified before or during the pulverization step (JP-A-292919/1989/EP 0948997).

However, even in these methods, because of high absorbency and tackiness and inferior heat resistance, the water-absorbent resin and its crosslinked hydrogel polymer have disadvantages in that: drying and pulverizing thereafter are very difficult, and the deterioration of properties and particle diameter distribution of the resultant water-absorbent resin are seen, and further, the energy efficiency and the productivity are very bad. In addition, there are problems in that aggregation of powder in the production steps is seen also after the pulverization or classification step, so that the production efficiency and the quality are deteriorated.

Furthermore, there is a known method in which the particle diameter distribution of the water-absorbent resin powder or its absorption properties under a load are improved by adding water only or an aqueous liquid containing an additive to the resultant polymer powder. Such a method is often used for such as granulation (U.S. Pat. No. 5,369,148), surface-crosslinking (U.S. Pat. No. 5,409,771, U.S. Pat. No. 5,422,405, and U.S. Pat. No. 5,597,873), and decrease of residual epoxy compounds (U.S. Pat. No. 5,981,070).

However, the water-absorbent resin absorbs water in a moment and thereby displays tackiness. Therefore, hitherto, the improvement of properties of the water-absorbent resin is insufficient because of nonuniform mixing of the aqueous liquid, and further, according to circumstance, continuous operation itself might be difficult because the water-absorbent resin, as aggregated due to the nonuniform mixing, adheres to the mixer. In addition, a polyhydric alcohol is favorable as the crosslinking agent or a solvent therefor also in respect to properties and safety, but it is difficult to uniformly mix the water-absorbent resin with aqueous liquids, particularly, an aqueous polyhydric alcohol solution because of its high hydrophilicity and viscosity.

Thus, there are known arts in which, when modifying a water-absorbent resin powder by adding thereto an aqueous liquid, a special mixer is used (EP 0450923, EP 0812873, etc.), or an inorganic powder is used (U.S. Pat. No. 4,587, 308), or an organic solvent is also used by adding it into an aqueous liquid (U.S. Pat. No. 4,734,478). However, the use of organic solvents, particularly, volatile ones, involves problems of causing the deterioration of properties in addition to problems of cost, environment, and safety. Furthermore, there is a known art in which, when adding an aqueous liquid to a water-absorbent resin, properties (AUL/Absorbency under Load) of the resin are controlled in a specific range (WO 98/49221). However, in such a method, the water-absorbent resin powder to which this method is applied is also very much limited, and its production is also difficult.

SUMMARY OF THE INVENTION

A. Objects of the Invention

The present invention has been made in consideration of the above-mentioned prior art problems and, from the above-mentioned present circumstances, an object of the present invention is to provide a production process which can produce a water-absorbent resin powder having a narrow particle diameter distribution and high properties by efficiently drying or pulverizing a crosslinked hydrogel polymer and making a particle diameter adjustment without thermal deterioration, and which inhibits adhesion and aggregation of the water-absorbent resin powder in the production steps, and displays good energy efficiency and high productivity.

Furthermore, another object of the present invention is to more improve properties of the water-absorbent resin powder by adding a uniform aqueous liquid (particular, aqueous crosslinking agent solution) by more improving the mixability even if a special mixer or organic solvent is not used.

B. Disclosure of the Invention

The present inventors diligently studied to achieve the above-mentioned objects. As a result, they have completed the present invention by finding that a production process for a water-absorbent resin powder provides the following good results that: the energy efficiency is good; the aggregation of the powder does not occur in the production steps; the thermal deterioration and the adhesion are very little in the drying step; and the pulverization step following the drying step is also extremely efficiently done; wherein the production process comprises the steps of: polymerizing an aqueous monomer solution containing a crosslinking agent; heat-drying the resultant crosslinked hydrogel polymer; and pulverizing the resultant dry polymer; wherein:

the dry polymer resultant from the heat-drying step is cooled before or during the pulverization step; and the water-absorbent resin powder has an average particle diameter of 200 to 600 $\mu$m after the pulverization step wherein the total ratio of particles having particle diameters of not larger than 150 $\mu$m and particles having particle diameters of not smaller than 850 $\mu$m in the water-absorbent resin powder is not more than 15 weight % of the water-absorbent resin powder.

In addition, the present inventors have completed the present invention by further finding that if the water-absorbent resin powder is cooled and further if its bulk density is adjusted, then its mixability with aqueous liquids (particularly, aqueous crosslinking agent solution) can be improved to thereby improve the continuous operability and the properties.

That is to say, a production process for a water-absorbent resin powder, according to the present invention, comprises the steps of: polymerizing an aqueous monomer solution containing a crosslinking agent; heat-drying the resultant crosslinked hydrogel polymer; and pulverizing the resultant dry polymer; wherein:

the dry polymer resultant from the heat-drying step is cooled before or during the pulverization step; and the water-absorbent resin powder has an average particle diameter of 200 to 600 $\mu$m after the pulverization step wherein the total ratio of particles having particle diameters of not larger than 150 $\mu$m and particles having particle diameters of not smaller than 850 $\mu$m in the water-absorbent resin powder is not more than 15 weight % of the water-absorbent resin powder.

In addition, another production process for a water-absorbent resin powder, according to the present invention, comprises the steps of: polymerizing an aqueous monomer solution containing a crosslinking agent; heat-drying the resultant crosslinked hydrogel polymer; and pulverizing the resultant dry polymer;

with the production process further comprising the steps of: forcibly cooling the dry polymer after the heat-drying step; and recycling the resultant heat in order to utilize it for forcible heating in a production process for a water-absorbent resin.

In addition, another production process for a water-absorbent resin powder, according to the present invention, comprises the steps of: polymerizing an aqueous monomer solution containing a crosslinking agent; heat-drying the resultant crosslinked hydrogel polymer; pulverizing the resultant dry polymer; and adding an aqueous liquid to the resultant powder in a mixer; wherein:

the temperature of the heat-drying step is in the range of 110 to 230° C.; the dry polymer is cooled into the range of 80 to 35° C. before the addition of the aqueous liquid; and the dry polymer is adjusted so as to have a bulk density of not less than 0.65 g/ml after the pulverization step.

In addition, another production process for a water-absorbent resin powder, according to the present invention, comprises the steps of: polymerizing an aqueous monomer solution containing a crosslinking agent; heat-drying the resultant crosslinked hydrogel polymer; pulverizing the resultant dry polymer; and adding an aqueous liquid to the resultant powder in a mixer; wherein:

the temperature of the heat-drying step is in the range of 110 to 230° C.; the dry polymer is cooled into the range of 80 to 35° C. before the addition of the aqueous liquid; the mixer is a stirring mixer having an internal wall temperature of not lower than 40° C.; and the mixture resultant from the addition of the aqueous liquid is reheated into the range of 110 to 230° C.

In addition, another production process for a water-absorbent resin powder, according to the present invention, comprises the steps of: polymerizing an aqueous monomer solution containing a crosslinking agent; heat-drying the resultant crosslinked hydrogel polymer; and pulverizing the resultant dry polymer; wherein:

the dry polymer is forcibly cooled after the heat-drying step;

the step of pulverizing the dry polymer is carried out so as to form a water-absorbent resin powder having a bulk density of not less than 0.65 g/ml; and the cooled water-absorbent resin powder is further surface-crosslinked.

In addition, another production process for a water-absorbent resin powder, according to the present invention, comprises the steps of: polymerizing an aqueous monomer solution containing a crosslinking agent; heat-drying the resultant crosslinked hydrogel polymer; and pulverizing the resultant dry polymer; wherein:

the dry polymer is forcibly cooled after the heat-drying step;

the step of pulverizing the dry polymer is carried out so as to form a water-absorbent resin powder having a bulk density of not less than 0.65 g/ml; and an aqueous liquid is further added to the cooled water-absorbent resin powder in a stirring mixer having a heated internal wall.

In addition, a water-absorbent resin powder, according to the present invention, is obtained by any one of the above production processes according to the present invention, and exhibits an absorption capacity of not less than 25 g/g under a load (1.96 kPa). An absorbent article, according to the present invention, comprises this water-absorbent resin powder.

In addition, another water-absorbent resin powder, according to the present invention, is obtained by a process including the steps of: polymerizing an aqueous monomer solution containing a crosslinking agent; heat-drying the resultant crosslinked hydrogel polymer; pulverizing the resultant dry polymer; and adding an aqueous polyhydric alcohol solution to the resultant powder in a mixer wherein the aqueous polyhydric alcohol solution does not contain any volatile organic solvents; wherein the resultant water-absorbent resin powder has the following properties: (1) the bulk density is not less than 0.65 g/ml; (2) the average particle diameter is in the range of 200 to 600 μm; (3) the total ratio of particles having particle diameters of not larger than 150 μm and particles having particle diameters of not smaller than 850 μm in the water-absorbent resin powder is not more than 10 weight % of the water absorbent resin powder; and (4) the absorption capacity under a load (1.96 kPa) is not less than 25 g/g. Another absorbent article, according to the present invention, comprises this water-absorbent resin powder.

These and other objects and the advantages of the present invention will be more fully apparent from the following detailed disclosure.

BRIEF DESCRIPTION OF THE DRAWING

FIG. 1 is a flowchart which illustrating a representative example of the present invention production process for a water-absorbent resin powder. The present invention is suitable for a continuous process including the steps of polymerization, drying, and pulverization, and one example thereof is shown.

DETAILED DESCRIPTION OF THE INVENTION

Hereinafter, one of modes for carrying out the present invention is explained in detail.

The production process for a water-absorbent resin powder, according to the present invention, is a production process for a water-absorbent resin powder which comprises the steps of: polymerizing an aqueous monomer solution containing a crosslinking agent; heat-drying the resultant crosslinked hydrogel polymer; and pulverizing the resultant dry polymer; wherein:

the dry polymer resultant from the heat-drying step is cooled before or during the pulverization step; and the water-absorbent resin powder has an average particle diameter of 200 to 600 μm after the pulverization step wherein the total ratio of particles having particle diameters of not larger than 150 μm and particles having particle diameters of not smaller than 850 μm in the water-absorbent resin powder is not more than 15 weight % of the water-absorbent resin powder.

In the first place, hereinafter, a production process for the crosslinked hydrogel polymer in the present invention is explained.

The water-absorbent resin in the present invention means a crosslinked polymer which can absorb 3 to 1,000 times, preferably 5 to 1,000 times, more preferably 10 to 800 times, still more preferably 100 to 700 times, as large a quantity of ion-exchanged water as its own weight without load when being swollen to saturation, thereby forming a water-insoluble swollen hydrogel. Incidentally, the term "water-insoluble" in the present invention usually means that the water-extractable content in the water-absorbent resin is not more than 40 weight %, preferably not more than 20 weight %, more preferably not more than 15 weight %, particularly preferably not more than 10 weight %, most preferably not more than 5 weight %, of the water-absorbent resin. Incidentally, the methods for measuring these properties will be described in the below-mentioned "DETAILED DESCRIPTION OF THE PREFERRED EMBODIMENTS" portion hereof. In the case where the water-extractable content is much, there are disadvantages not only in that the properties (e.g. absorption capacity under load, liquid permeation quantity under load) are deteriorated, but also in that it is difficult to uniformly add the aqueous liquid to the water-absorbent resin powder.

The crosslinked hydrogel polymer, as used in the present invention production process for the water-absorbent resin powder, is a polymer obtained by polymerizing an aqueous monomer solution containing a crosslinking agent. Examples of this crosslinked hydrogel polymer include crosslinked polymers which are water-absorbent and cationic, anionic, or nonionic, and they may be used either alone respectively or in combinations with each other. However, preferably for most displaying the effects of the present invention, the crosslinked hydrogel polymer comprises a major proportion of anionic crosslinked polymer as an essential component, and more preferably, its functional groups comprises a major proportion of carboxyl groups.

In the present invention, from the viewpoint of obtaining great effects, the anionic crosslinked polymer is preferably a crosslinked hydrogel polymer obtained by using acrylic acid (salt) as an acid-group-containing unsaturated monomer (salt), and is more preferably a crosslinked hydrogel polymer obtained by polymerizing acrylic acid (salt) as neutralized in a ratio of 0 to 90 mol %, still more preferably 0 to 80 mol %, and particularly still more preferably 0 to 10 mol %. In other words, the process according to the present invention is preferably applied to crosslinked poly(acrylic acids), particularly, unneutralized or low-neutralized ones, because their properties are greatly deteriorated in the drying or pulverizing step of conventional processes.

In addition, the above monomer comprises a major proportion of acrylic acid (salt) as stated above, and may, if necessary, further comprise monomers other than this acrylic acid (salt), namely, other monomers copolymerizable therewith, and further, the water-absorbent resin may be obtained from the monomers other than acrylic acid.

The usable monomer other than acrylic acid is not especially limited, but examples thereof include: acid-group-containing unsaturated monomers, such as methacrylic acid, maleic acid, crotonic acid, sorbic acid, itaconic acid, cinnamic acid, maleic anhydride, vinylsulfonic acid, allylsulfonic acid, vinyltoluenesulfonic acid, styrenesulfonic acid, 2-(meth) acrylamido-2-methylpropanesulfonic acid, 2-(meth) acryloylethanesulfonic acid, 2-(meth) acryloylpropanesulfonic acid, and 2-hydroxyethyl (meth) acryloylphosphate, and their salts; and nonionic unsaturated monomers containing hydrophilic groups, such as acrylamide, methacrylamide, N-ethyl(meth)acrylamide, N,N-dimethyl (meth)acrylamide, 2-hydroxyethyl (meth) acrylate, 2-hydroxypropyl (meth)acrylate, methoxypolyethylene glycol (meth)acrylate, polyethylene glycol mono (meth)acrylate, vinylpyridine, N-vinylpyrrolidone, N-acryloylpiperidine, and N-acryloylpyrrolidine. These other monomers may be used either alone respectively or fitly in combinations with each other. When using these other unsaturated monomers, their content may be set at not more than 50 mol %, preferably not more than 30 mol %, of the monomers including acrylic acid.

When using the acid-group-containing or basic-group-containing monomer in the present invention, the acid or basic functional group of the monomer or polymer may be neutralized. The neutralizing agent as used in the present invention is not especially limited, but conventional inorganic or organic base or acid can be used for the monomer or polymer.

For example, when using the acid-group-containing monomer in the present invention, specific examples of the base which is used as the neutralizing agent for the monomer or its polymer include: inorganic bases, such as sodium hydroxide, potassium hydroxide, lithium hydroxide, lithium carbonate, ammonium hydroxide, sodium carbonate, potassium carbonate, ammonium carbonate, sodium hydrogencarbonate, potassium hydrogencarbonate, and ammonium hydrogencarbonate; and organic bases, such as ethanolamine, diethanolamine, triethanolamine, polyethylenimine, polyallylamine, (poly)lysine, and (poly) arginine. In addition, when using the basic-group-containing monomer in the present invention, inorganic or organic acids similarly may fitly be selected as the neutralizing agents.

Incidentally, when using a high-molecular neutralizing agent (for example, polyamine), the crosslinking may be carried out by this neutralizing agent, but, of the above neutralizing agents, alkaline metal salts, particularly, lithium or sodium salts, are preferably used, and 50 to 90 mol %, preferably 60 to 80 mol %, of the acid groups in the water-absorbent resin are neutralized. The final neutralization ratio of the water-absorbent resin as obtained in the present invention is preferably in the above range.

In addition, the neutralization may be carried out by using the above base or acid in the form of aqueous solution, dispersion, or gel, or by adding the base or acid as it is a solid, in other words, by what is called dry blending (powder blending). In addition, the neutralization may be carried out upon the monomer, or upon the crosslinked hydrogel polymer before drying, or upon the dry polymer after drying, or upon a pulverized or classified product thereof, or these neutralizations can be used jointly with each other. Furthermore, the neutralization may be carried out by allowing the acid and the base to entirely react with each other, or by allowing the acid and the base to only partially react with each other by such as dry blending, thus obtaining a water-absorbent resin composition which is a mixture of the above acid and the above base.

In addition, when carrying out the neutralization in the present invention, the post-neutralization of the crosslinked hydrogel polymer or its dry polymer, particularly, the post-neutralization of the dry polymer, is one of favorable methods in the present invention. Specifically, in the present invention, because an unneutralized or low-neutralized crosslinked poly(acrylic acid) can efficiently be dried (powdered) without deteriorating its properties, it is possible to carry out the post-neutralization of the resultant crosslinked poly(acrylic acid) powder. Accordingly, there are advantages in that a water-absorbent resin having higher properties can be obtained by the method in which the crosslinked poly(acrylic acid) powder is post-neutralized.

In addition, when obtaining the above-mentioned crosslinked hydrogel polymer, the means therefor may be such as radical crosslinking or self crosslinking if the resultant polymer is water-insoluble. However, usually, a crosslinked structure is introduced into the polymer by using an internal-crosslinking agent. This internal-crosslinking agent may be a compound having at least two polymerizable unsaturated groups and/or reactive groups per molecule, or a compound having at least two substituents copolymerizable and/or reactable with the monomer per molecule. In addition, when using the compound having at least two reactable substituents per molecule, the crosslinking agent may uniformly be added to a water-soluble or water-insoluble polymer gel resultant from the polymerization, thereby post-crosslinking the inside of the polymer gel.

Specific examples of the above internal-crosslinking agent include N,N'-methylenebis(meth)acrylamide, (poly) ethylene glycol di(meth)acrylate, (poly)propylene glycol di(meth)acrylate, trimethylolpropane tri(meth)acrylate, trimethylolpropane di(meth)acrylate, glycerol tri(meth) acrylate, glycerol acrylate methacrylate, ethylene-oxide-modified trimethylolpropane tri(meth)acrylate, pentaerythritol tetra(meth)acrylate, dipentaerythritol hexa (meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether, ethylene glycol, polyethylene glycol, propylene glycol, glycerol, pentaerythritol, ethylenediamine, polyethylenimine, and glycidyl (meth)acrylate. However, the internal-crosslinking agent is not especially limited.

These internal-crosslinking agents may be used either alone respectively or in the form mixed with or separately from each other. Of the above-exemplified internal-crosslinking agents, those which have at least two polymerizable unsaturated groups per molecule are preferably used during the polymerization because they can give a water-absorbent resin of which the properties are more improved.

The amount of the internal-crosslinking agent, as used, depends upon the kind of the crosslinking agent or upon the aimed crosslinking density, but is preferably in the range of 0.005 to 3 mol %, more preferably 0.01 to 1.5 mol %, still more preferably 0.05 to 1 mol %, of the above monomer. In the case where the amount of the above internal-crosslinking agent as used is smaller than 0.005 mol % or larger than 3 mol %, a water-absorbent resin with desired properties might not be obtained.

Incidentally, when carrying out the polymerization, the following materials may be added to the reaction system: hydrophilic polymers such as starch, its derivatives, cellulose, its derivatives, poly(vinyl alcohol), poly(acrylic acid) (or its salts), and crosslinked poly(acrylic acid) (or its salts) (the amount of these materials as added is preferably in the range of 0 to 40 parts by weight, more preferably 0 to 10 parts by weight, per 100 parts by weight of the monomer); and chain transfer agents (e.g. hypophosphorous acid (or its salts)), chelating agents, and foaming agents (e.g. carbonate salts) (the amount of these materials as added is preferably in the range of 0 to 5 parts by weight, more preferably 0 to 1 parts by weight, per 100 parts by weight of the monomer).

The method for polymerizing the above monomer is not especially limited. For example, conventional methods, such as aqueous solution polymerization, reversed-phase suspension polymerization, bulk polymerization and precipitation polymerization, are available. Of these polymerization methods, methods in which an aqueous solution of the monomer is prepared and then polymerized, namely, the aqueous solution polymerization and the reversed-phase suspension polymerization, are preferable in the present invention in consideration of the easiness of the polymerization reaction control and the performance of the resultant water-absorbent resin.

Incidentally, the reversed-phase suspension polymerization is a polymerization method which comprises the step of suspending an aqueous monomer solution into a hydrophobic organic solvent. Examples thereof are disclosed in U.S. patents such as U.S. Pat. No. 4,093,776, U.S. Pat. No. 4,367,323, U.S. Pat. No. 4,446,261, U.S. Pat. No. 4,683,274, and U.S. Pat. No. 5,244,735. The aqueous solution polymerization is a polymerization method which comprises the step of polymerizing an aqueous monomer solution without using a dispersing solvent. Examples thereof are disclosed in U.S. patents such as U.S. Pat. No. 4,625,001, U.S. Pat. No. 4,873,299, U.S. Pat. No. 4,286,082, U.S. Pat. No. 4,973,632, U.S. Pat. No. 4,985,518, U.S. Pat. No. 5,124,416, U.S. Pat. No. 5,250,640, U.S. Pat. No. 5,264,495, U.S. Pat. No. 5,145,906, and U.S. Pat. No. 5,380,808, and European patents such as EP 0811636, EP 0955086, and EP 0922717. Including the above methods, the polymerization method is not especially limited in the present invention, but the present invention is particularly favorably utilized for the aqueous solution polymerization in which drying and pulverization are conventionally difficult.

When adopting the aqueous solution polymerization and the reversed-phase suspension polymerization as the polymerization methods, the concentration of the monomer component, that is, the ratio of the monomer in the aqueous solution, is not especially limited, but is preferably in the range of 10 to 70 weight %, more preferably 15 to 60 weight %, still more preferably 20 to 50 weight %, particularly preferably 30 to 45 weight %, in consideration of properties.

In addition, the reaction conditions such as reaction temperature and reaction time may be set fitly for the monomer as used, and are not especially limited. However, the polymerization is usually carried out in the range of 0° C. to the boiling point, preferably 10 to 110° C., more preferably 15 to 100° C. (lowest temperature to highest temperature, or initiation temperature to peak temperature), and such polymerization is preferably carried out under an atmosphere of an inert gas such as nitrogen. Furthermore, the atmosphere during the polymerization may be put at a reduced or increased pressure, but usually the polymerization is carried out under normal pressure.

Usable for initiating the polymerization are, for example, radical polymerization initiators, such as potassium persulfate, ammonium persulfate, sodium persulfate, t-butyl hydroperoxide, hydrogen peroxide, and 2,2'-azobis(2-amidinopropane) dihydrochloride, or active energy rays, such as ultraviolet rays (using an ultraviolet polymerization initiator, if necessary) and electron beam. These may be used in combinations with each other.

In addition, when using the above oxidizable radical polymerization initiators, they may be combined with reducing agents, such as sodium sulfite, sodium hydrogensulfite, ferrous sulfate, and L-ascorbic acid, thereby carrying out redox polymerization. The amount of these polymerization initiators as used is preferably in the range of 0.001 to 2 mol %, more preferably 0.01 to 0.5 mol %. Incidentally, the polymerization initiator may usually be added by dissolving or dispersing it into a solvent such as water.

The crosslinked hydrogel polymer as obtained by the above polymerization is pulverized, if necessary, and then dried. As to this crosslinked hydrogel polymer which gets subjected to the drying step, in the present invention, a particulate one (its average particle diameter is, for example, not larger than 2 cm, preferably not larger than 1 cm, more preferably not larger than 5 mm) is preferable also for the resulting properties. As to the pulverization method for forming the crosslinked hydrogel polymer into particles, in the present invention, the pulverization may be carried out at the same time as the polymerization by use of a kneader, or separately after the polymerization, or the pulverization during the polymerization may be used jointly with the pulverization after the polymerization. Incidentally, when the crosslinked hydrogel polymer is not dried in a particulate state, for example, when the crosslinked hydrogel polymer is dried in a filmy state, the resultant properties or particle diameters might be inferior.

As to the particle diameter of the crosslinked hydrogel polymer before drying, the weight-average particle diameter is preferably in the range of 45 to 4,000 $\mu$m, more preferably 50 to 2,000 $\mu$m, still more preferably 100 to 1,500 $\mu$m, yet still more preferably 200 to 1,000 $\mu$m, in consideration of the drying efficiency and the properties. Examples of apparatuses suitable for such pulverization include a kneader, a vertically cutting type slitter having cutter blades, a horizontally cutting type slitter having cutter blades, a cutter type pulverizer having rotary blades, and a meat chopper having a predetermined aperture diameter. Incidentally, in the case where the weight-average particle diameter of the crosslinked hydrogel polymer deviates from the above range, there is a possibility such that the water absorption capacity of the resultant water-absorbent resin powder might be low, or that its water-extractable content might be high.

The crosslinked hydrogel polymer as obtained in the above way needs to be heat-dried. Incidentally, the term "drying" in the present invention means putting the crosslinked hydrogel polymer in a solid state with a solid content of not less than 80 weight %, preferably not less than 85 weight %, more preferably not less than 90 weight %, particularly preferably not less than 93 weight %.

In addition, such a drying step in the present invention does not need to give a dry polymer having a solid content of 100 weight % (water content: 0), and the crosslinked hydrogel polymer is preferably dried to not more than 99 weight %, more preferably not more than 98 weight %, still more preferably not more than 97 weight %, most preferably into the range of 97 to 93 weight %, in terms of solid content.

That is to say, when the solid content is high after the drying step, it is easy to improve properties by surface-crosslinking, and further, the powder aggregates little in the subsequent production steps, therefore handling in a powdery state is easy. However, not only might much time be needed for drying, but also the properties might be deteriorated by the increase of fine powders in the pulverizing step or subsequent steps or when being used, or by the drying for a long time. However, the present invention, which involves the forcible cooling step after the drying step, is advantageous in that: it is not necessary to, conventionally, excessively increase the solid content of the dry polymer or water-absorbent resin powder in order to inhibit the powder from aggregating in the production steps and to pulverize the dry polymer, therefore the drying time can be shortened and the properties can be improved.

The heat-drying method as used in the present invention is not especially limited. Examples thereof include drying methods such as hot-wind drying, thin-film drying with such as a drum dryer, reduced-pressure drying, stir-drying, and fluidized-bed drying. These drying methods may be used either alone respectively or in combinations with each other, and it doesn't especially matter whether the drying type is a continuous type or batch type. Of the above drying methods, the hot-wind drying, particularly, continuous hot-wind drying, is preferably used in consideration of the properties as well as the drying efficiency in the present invention and, for example, the continuous hot-wind drying may be carried out by static drying on a belt.

From the viewpoint of the drying efficiency, the above hot-wind drying may be carried out by laminating the particulate crosslinked hydrogel polymer onto a metal gauze and/or a punching metal with apertures or slits and then passing a hot wind through spaces between the laminated particles in a vertical or horizontal direction, preferably in a vertical direction, of the gel. As to the metal gauze as used or the aperture diameter, for a example, the aperture or metal gauze may have aeration holes of the diameter of about 0.1 to about 5 mm, preferably about 0.2 to about 2 mm. In addition, as to the lamination of the gel onto the metal gauze or the punching metal, the particulate crosslinked hydrogel polymer may be laminated into a definite thickness of 1 to 20 cm, preferably 1.5 to 10 cm, more preferably 2 to 8 cm, in consideration of the properties resultant from the drying step.

When drying the above crosslinked hydrogel polymer, the drying temperature may be set usually at not lower than about 100° C., preferably in the range of about 110 to about 230° C., more preferably about 130 to about 200° C., particularly preferably about 150 to about 190° C., in consideration of the properties and the productivity. Incidentally, the drying temperature is determined by the material temperature or the temperature of the heat medium (e.g. hot wind), but, preferably, is determined by the temperature of the heat medium. In addition, the drying temperature may be kept constant during the drying step, or may be changed fitly in the above temperature range on a way of the drying step. Furthermore, when the hot-wind drying is carried out, the dew point of the hot wind is preferably in the range of 40 to 100° C., more preferably 50 to 90° C., still more preferably 60 to 85° C., in consideration of the properties and the energy efficiency.

The dry polymer as obtained in the above way is necessarily forcibly cooled, and thereafter or simultaneously therewith pulverized. In the present invention, the forcible cooling and the pulverization may be carried out simultaneously with each other, but, preferably, the pulverization is carried out after the forcible cooling. In the present invention, the term "forcible cooling" represents a procedure or step for cooling the dry polymer externally and intentionally. In addition, the term "pulverization" represents a mechanical procedure for forming the resultant dry polymer or its aggregate (block-shaped material) into a fluid powder.

Furthermore, the term "disintegration" represents a mechanical procedure which does not lead to physical destruction of the dry polymer or its particle diameter reduction, but lightly disintegrates the aggregation into several millimeters to tens of millimeters, and.

Incidentally, it is also herein mentioned that the particulate crosslinked hydrogel polymer as dried in the laminated state easily becomes a block-shaped dry material by losing the fluidity due to aggregation between particles after being dried. Such a block-shaped material is an aggregate of particles of the dry polymer and therefore has continuous spaces and gas permeability through the blocks, but has nonfluidity due to aggregation and therefore needs the pulverization (disintegration) step.

As to the method for carrying out the forcible cooling in the present invention, the dry polymer may be cooled to a predetermined temperature by intentionally inserting the cooling step between the drying step and the pulverizing step. Examples of the forcible cooling method include: (1) a method in which the dry polymer is placed into a vessel (hopper) or cylinder having a cooled heat transfer surface and, if necessary, involving agitation, and then forcibly cooled; (2) a method in which the dry polymer is sufficiently cooled by heat radiation therefrom on a continuous belt (which has been used in the drying step); (3) a method in which the dry polymer is forcibly cooled by passing a cold wind through it; (4) a method in which the dry polymer is forcibly cooled simultaneously with transportation using a cold air; and (5) a method in which the dry polymer is forcibly cooled using a low-temperature screw conveyer having a cooled heat transfer surface; wherein the dry polymer is a product by the heat-drying.

Of these methods, the method (3) involving the cold wind through-passing is preferably used in view of the cooling efficiency and the fluidity of the dry polymer in the present invention. In this method, the cold wind may be passed only through the surface of the dry polymer, but is preferably passed through spaces between the laminated particles in a vertical or horizontal direction, preferably in a vertical direction, of the laminated dry polymer or its block-shaped material because thereby the forcible cooling can more efficiently be carried out. Incidentally, in the case where the lamination is performed, its thickness is preferably in the aforementioned range.

The forcible cooling in the present invention is necessarily carried out before or during the pulverization. In addition, the present inventors have found that the object of the present invention is not achieved unless the forcible cooling is carried out before or during the pulverization rather in the case of drying on a production scale, unlike the case of drying and pulverization on a laboratory scale which are polymerization, drying, and pulverization on a small scale in a laboratory, and further, involve easy natural heat radiation cooling because the experimental procedures are discontinuous therebetween and because the interval therebetween is in the range of tens of minutes to several hours or more. That is to say, the present invention is more favorable for continuous drying, continuous pulverization, and the subsequent continuous addition of the aqueous liquid on a large scale in production facilities (for example, treating not less than 1 ton/day, preferably not less than 10 tons/day, of water-absorbent resin powder per line).

In the case where the forcible cooling (which is an essential feature of the present invention) is not carried out after the heat-drying, the efficiency of the pulverization or classification is greatly deteriorated, therefore the water-absorbent resin powder which has excellent particle diameter distribution cannot be obtained with good productivity. Furthermore, in the case where the hot-wind drying is carried out on the metal gauze or the punching metal, conventionally the resultant dry polymer adheres to or clogs the metal gauze or the punching metal and therefore greatly deteriorates the gas permeability, the drying efficiency and the productivity. However, the present invention which involves the forcible cooling does not have such problems and does not need either a special apparatus for inhibiting the adhesion (JP-A-270070/1995) or the periodic removal of the adhesion or clogging from the dryer. In addition, the forcible cooling before or during the pulverization has advantages in that the particle diameter distribution and the pulverization rate of the resultant water-absorbent resin powder are also excellent, and in that the adhesion to the pulverizer and the aggregation of the powder in the production steps are also greatly decreased, and further in that it is not necessary to excessively dry the water-absorbent resin powder in order to inhibit the powder from aggregating in the subsequent production steps, therefore the drying time can be shortened and the properties can be improved.

The cold wind (gas) as used for the aforementioned method (3) in the present invention is fitly determined according to the temperature of the aimed dry polymer. The forcible cooling is carried out by a gas having a temperature of not higher than 60° C., preferably in the range of 50 to −50° C., more preferably 40 to −10° C., particularly preferably 35 to 5° C., in consideration of the cooling efficiency. On this occasion, the dew point of the gas is preferably not higher than 60° C., more preferably not higher than 50° C. In addition, such a gas may be an inert gas, such as nitrogen, or a mixed gas comprising the inert gas and air, but air, particularly, filtered air, is preferably used.

Furthermore, the wind speed of the cold wind is in the range of about 10 to about 0.1 m/s, preferably about 5 to about 0.5 m/s. The cooling time is preferably in the range of 60 to 0.1 minutes, more preferably 20 to 0.2 minutes, still more preferably 10 to 0.5 minutes.

As to the forcible cooling temperature in the present invention, the dry polymer is forcibly cooled to a temperature of not higher than 95° C., preferably into the range of 85 to 35° C., more preferably 80 to 40° C., still more preferably 70 to 45° C. Incidentally, the forcible cooling temperature is determined by fitly measuring the material temperature with such as a contacting thermometer or non-contacting thermometer (infrared thermometer), and further, if necessary, controlled.

In the case where the temperature of the dry polymer is higher than 95° C., it is so difficult to release the polymer from the metal gauze or punching metal of the dryer that the drying efficiency is low, and further, the efficiency of the pulverization or classification of the dry polymer is greatly deteriorated and, as a result, it is difficult to obtain an excellent water-absorbent resin powder having a narrow particle diameter distribution. In addition, in the case where the temperature is too low, there are disadvantages not only in that a long time or large facilities are needed for cooling, but also in that an aggregate of the water-absorbent resin powder unexpectedly forms during the pulverization or classification. Furthermore, the overcooling might be disadvantageous to the below-mentioned forcible heating and surface-crosslinking in respect to properties and energy.

In addition, as to the temperature lowering of the dry polymer by the forcible cooling in order to achieve the present invention, although it depends upon the heat-drying temperature, the dry polymer may be forcibly cooled to the above-mentioned aimed temperature (for example, more preferably in the range of 80 to 40° C.) by forcibly cooling the dry polymer so that the temperature of the dry polymer can change by preferably not less than 40° C., more preferably not less than 60° C., still more preferably not less than 80° C., particularly preferably not less than 100° C., from before till after the forcible cooling.

Incidentally, the heat as taken away from the dry polymer by the forcible cooling is preferably recycled. For example, as is aforementioned, in the present invention, the heat-drying is carried out by hot-wind drying (particularly preferably in the range of 150 to 180° C.), and the forcible cooling is carried out by wind-cooling (particularly preferably, the polymer is forcibly cooled into the range of 70 to 45° C.). When carrying out such drying by hot-wind and forcible cooling by wind-cooling in the present invention, the cold wind as used for the forcible cooling of the dry polymer is controlled fitly for factors, such as the wind speed or through-flow rate of the cold wind or the temperature of the polymer, but becomes a warm or hot wind (usually of not lower than 50° C., preferably in the range of 50 to 200° C., more preferably in the range of 60 to 150° C., still more preferably in the range of 70 to 110° C.) due to the forcible cooling. Therefore, the resultant warm or hot wind may be recycled and then, as it is, utilized for the production steps for the water-absorbent resin, or may be reheated and then utilized for the production steps for the water-absorbent resin, such as the aforementioned hot-wind drying.

In the present invention the heat obtained by the forcible cooling is preferably recycled. Examples of the production steps in which the recycled heat is used include the heat-retaining step, but the below-mentioned drying step is the most preferable. Specifically, the cold wind used for the forcible cooling becomes a warm wind by being passed through the dry polymer, therefore preferably in the present invention this warm wind (e.g. 60 to 150° C.) resultant from the forcible cooling is supplied through piping into an air-supplying inlet of a hot-wind dryer to thereby be used as a raw material for drying, so that the continuous drying can be carried out. In the hot-wind drying step in the present invention, in this way, the warm wind resultant from the forcible cooling is used in place of air of room temperature in order to produce a hot wind, therefore there are advantages in that much energy saving is realizable rewarding it and in that the warm wind (waste gas) is not discharged to the environment. Also in view of such recycling, forcible cooling by passing a cold wind through the polymer is used for the forcible cooling step in the present invention, and further, hot-wind drying is used for the heat-drying step in the present invention.

That is to say, the present invention further provides a production process for a water-absorbent resin powder which comprises the steps of: polymerizing an aqueous monomer solution containing a crosslinking agent; heat-drying the resultant crosslinked hydrogel polymer; and pulverizing the resultant dry polymer; with the production process further comprising the steps of: forcibly cooling the dry polymer after the heat-drying step; and recycling the resultant heat in order to utilize it for forcible heating in a production process for a water-absorbent resin (which involves heating of the gel such as drying step). In this production process, the recycling for the forcible heating means that the heat as obtained in the forcible cooling step is utilized for the forcible heating step. The forcible cooling step and the forcible heating step may both be included in the same production line, or may separately be included in their respective production lines.

In addition, when carrying out the hot-wind drying and the wind-cooling in the present invention, such as a fluid bed is separately set as a drying and cooling apparatus. For example, when carrying out continuous hot-wind drying, also preferable is a method in which: a belt type dryer is used and a portion of the second half of the dryer is utilized for the cooling step. In this method, even if the cooling apparatus is not separately set, a ¼ to ¹/20 portion (preferably ⅛ to ¹/16 portion) of the second half of the belt of the hot-wind dryer may be partitioned off as a cooling apparatus to feed a cold wind to this portion to thereby carrying out the forcible cooling step, and then the heat as taken away from the dry polymer may be recycled.

The present invention can afford excellent energy efficiency to the process because the heat as obtained by forcibly cooling the dry polymer is recycled. In addition, there are advantages in that: the releasability of the dry polymer from the metal gauze or punching metal of the belt is greatly enhanced by forcibly cooling the second half of the dryer, and the drying efficiency is also enhanced because of the enhancement of the gas permeability due to no clogging of the belt.

The dry polymer, as forcibly cooled to a predetermined temperature in the above way, is then pulverized or classified, preferably, necessarily pulverized and then classified. The drying step and the pulverization or classification step, as mentioned above, are preferably carried out continuously to each other, and the residence time from an outlet of the dryer to an inlet of the pulverizer is within 10 minutes, preferably within 5 minutes, more preferably within 2 minutes. In the present invention, even if the above steps are carried out continuously to each other in this way, the drying and pulverizing efficiencies can greatly be enhanced by inserting the forcible cooling step between the drying step and the pulverizing step.

There is no especial limitation with regard to the pulverization method in the present invention if the dry polymer or its aggregate (block-shaped material) can be formed into a fluid powder, preferably a powder having an average particle diameter of not larger than 2 mm. Examples thereof include: a pulverization method involving the use of a hammer type pulverizer, a roll type pulverizer, or a jet air stream type pulverizer; and conventional various pulverization or disintegration methods. These methods may be used either alone respectively or in combinations with each other. In addition, in the case where the aggregation is weak in the drying step, the pulverizing step may be carried out by classifying the dry polymer while vibrating it, thereby loosening the aggregation of the polymer, even if no pulverizer is especially used.

In the present invention, coarse particles and fine powders are if necessary or preferably removed by classification after the above pulverization. The average particle diameter of the water-absorbent resin powder as obtained in this way is determined according to purposes, but, for example, in the case where this powder is used for sanitary materials, the average particle diameter of the water-absorbent resin powder as finally obtained is in the range of 200 to 600 $\mu$m, preferably 300 to 600 $\mu$m, more preferably 300 to 550 $\mu$m, and the total ratio of particles having particle diameters of not larger than 150 $\mu$m and particles having particle diameters of not smaller than 850 $\mu$m in the water-absorbent resin powder is preferably not more than 15 weight %, more preferably not more than 10 weight %, still more preferably not more than 5 weight %, of the water-absorbent resin powder.

In the present invention, particularly, it is preferable that the water-absorbent resin powder, as obtained after the pulverization step and then used for the next step, has an average particle diameter in the above range, namely, in the range of 200 to 600 $\mu$m wherein the total ratio of particles having particle diameters of not larger than 150 $\mu$m and particles having particle diameters of not smaller than 850 $\mu$m in the water-absorbent resin powder is not more than 15 weight % of the water-absorbent resin powder.

The bulk density of the water-absorbent resin powder as obtained in the above way variously changes according to true density (g/cm$^3$) which is absolutely determined by the monomer composition one by one. However, for example, when the water-absorbent resin is a poly(sodium acrylate), particularly, that which has a neutralization ratio of 50 to 90 mol %, preferably 60 to 80 mol %, the bulk density is usually not less than 0.63 g/ml, particularly preferably not less than 0.65 g/ml, as measured by the apparatus according to JIS K-3362. In the forcible cooling method in the present invention, the water-absorbent resin powder resultant from the pulverization has few scales and has a more roundish and uniform shape. Therefore, the bulk density of the powder tends to be high, and is preferably adjusted into the range of 0.65 to 0.89 g/ml, more preferably 0.67 to 0.88 g/ml, still more preferably 0.73 to 0.87 g/ml, yet still more preferably 0.74 to 0.86 g/ml, yet still more preferably 0.75 to 0.85 g/ml.

In the case where the bulk density is lower than 0.63 g/ml, there are disadvantages in that: it becomes difficult to mix the below-mentioned aqueous liquid even if the temperature is controlled; and not only deterioration of properties (absorption capacity under a load, liquid permeability under a load), but also, for example, deterioration of impact resistance (process damage) of the water-absorbent resin powder, and increase of the transportation cost due to decrease of the weight per unit volume might be observed. In addition, in the case where the bulk density is higher than 0.89 g/ml, it can be difficult to ensure liquid permeation spaces in a gel when being swollen by liquid permeation under a load.

After the above pulverization, coarse particles (e.g. 850-$\mu$m-on fractions) or fine powders (e.g. 150-$\mu$m-passed fractions) may be recycled fitly as the case may be. The coarse particles may be repulverized, and the fine particles may be removed or recovered, thus adjusting the particle diameter distribution into the aforementioned range. However, in the present invention the necessity of such recycling is greatly decreased because the particle diameter distribution is narrow. Incidentally, methods for recycling the fine powders of water-absorbent resins are, for example, disclosed in U.S. Pat. No. 4,950,692, U.S. Pat. No. 5,064,582, U.S. Pat. No. 5,264,495, U.S. Pat. No. 5,478,879, EP 0812873, EP 0885917, and EP 0844270, and these fine powder recycling methods can also be applied to the present invention.

In addition, the amount of fine powders being recycled is not larger than 15 weight %, preferably in the range of 1 to 10 weight %, more preferably 2 to 8 weight %, of the entirety. In the present invention, a water-absorbent resin powder having a narrow particle diameter distribution can be obtained with good productivity, therefore there are advantages in that a water-absorbent resin powder having a narrower particle diameter distribution can be obtained by the recycling of a small amount of fine powder.

In the present invention in which the cooling is carried out before the pulverization, the resultant particle diameter distribution is narrower than conventional ones, and further, there are the following effects: the pulverization time to obtain such a particle diameter distribution is shortened; coarse water-absorbent resin powders having particle diameters larger than the aimed ones are decreased; it is unnecessary to take the trouble to separate the largest particles or fine powders which deviate from the purpose; and the labor for recycling such as repulverization of large particles (e.g. 850-µm-on fractions) and reclassification of fines (e.g. 150-µm-passed fractions) decreases.

It is preferable that after being cooled and then pulverized and then classified, the water-absorbent resin powder is, further, heat-retained or forcibly heated in the next step. The temperature of the heat-retention from the outside is in the range of 40 to 100° C., preferably 50 to 90° C. The heat-retention of the water-absorbent resin powder at such a temperature improves the handling ability of the water-absorbent resin powder and inhibits the aggregation and adhesion of the water-absorbent resin powder in the production steps. In the present invention, the drying and pulverizing efficiencies may be enhanced by daring to forcibly cool and then pulverize or classify the dry polymer and, separately, the water-absorbent resin powder may further be heat-retained or forcibly heated (reheated) after being cooled.

Incidentally, in the case where the aqueous liquid, especially, an aqueous crosslinking agent solution, is added, it is preferable that the water-absorbent resin powder, as obtained by carrying out the forcible cooling before the pulverization, is further forcibly cooled after the pulverization, thereby adjusting the temperature of the powder. The means for this temperature controlling or cooling is not especially limited, but the pulverization increases the fluidity and the specific surface area of the water-absorbent resin powder, therefore it is possible to more preferably apply the aforementioned cooling means, for example: (1) a method in which the powder is placed into a vessel (hopper) or cylinder having a cooled heat transfer surface and, if necessary, involving agitation, and then forcibly cooled; (2) a method in which the powder is sufficiently cooled by heat radiation therefrom on a continuous belt; (3) a method in which the powder is forcibly cooled by passing a cold wind through it; (4) a method in which the powder is forcibly cooled simultaneously with transportation using a cold air; and (5) a method in which the powder is forcibly cooled using a low-temperature screw conveyer having a cooled heat transfer surface. It is, however, preferable to use at least the method (1).

Specifically, the temperature of the water-absorbent resin powder, to which the aqueous liquid has not been added yet, is preferably lowered (controlled) into the range of 80 to 35° C., more preferably 70 to 35° C., still more preferably 60 to 35° C., particularly preferably 50 to 35° C., by the aforementioned forcible cooling and, if necessary, further heat-retaining or cooling, and then the aqueous liquid is added to this powder. In the case where the temperature of the water-absorbent resin powder, to which the aqueous liquid has not been added yet, is high, the mixing of the aqueous liquid is nonuniform. In addition, in the case where the powder is cooled forcibly or by heat radiation as much as to lower than 35° C., there are disadvantages in that: not only does it take much time, but also the aggregation of the cooled powder is observed, or the energy loss is much in the reheating step.

The water-absorbent resin powder as obtained in the above way has excellent particle diameter distribution and is therefore favorable for more improving its properties by surface-crosslinking. The following forcible heating may separately be carried out for the surface-crosslinking.

Specifically, considering the step of forcibly heating the water-absorbent resin powder after the pulverization or classification step, the forcible cooling step in the present invention appears to be in vain with respect to energy and process, but, unexpectedly, comparatively increases the drying and pulverizing efficiencies, and also enhances the mixability of the resultant water-absorbent resin powder with the aqueous liquid.

There is no especial limitation in the surface-crosslinking agent as used in the present invention, if this agent comprises a compound reactable with a functional group of the above polymer. Specific examples of the above surface-crosslinking agent include: polyhydric alcohols such as propylene glycol, glycerol, and butanediol; polyepoxy compounds such as ethylene glycol diglycidyl ether; polyamine compounds such as (poly)ethylenimine; alkylene carbonate compounds; polyoxazoline compounds; haloepoxy compounds and their polyamine adducts (e.g. polyamide-polyamide epihalohydrin adducts: Kymene (trademark) made by Hercules); mono-, di-, or polyoxazolidinone compounds; and polyvalent metals, but there is no especial limitation thereto. These surface-crosslinking agents may be used either alone respectively or in combinations with each other. In the case where the combinations are used in the present invention, the use of a surface-crosslinking agent comprising a combination of a first surface-crosslinking agent and a second surface-crosslinking agent whose solubility parameters (SP values) are deferent from each other (refer to U.S. Pat. No. 5,422,405), of the above surface-crosslinking agents, has the advantage of enabling to obtain a water-absorbent resin powder which exhibits particularly excellent absorption capacity under a heavy load (e.g. not less than 4.90 kPa).

The amount of the above crosslinking agent, as used, is determined fitly for such as its type and reaction conditions, but is usually in the range of 0.001 to 10 parts by weight, preferably 0.01 to 5 parts by weight, more preferably 0.5 to 4 parts by weight, per 100 parts by weight of the solid content of the water-absorbent resin powder.

When the step of mixing the above polymer and surface-crosslinking agent together is carried out, such as water, steam, or an aqueous liquid comprising water and a hydrophilic organic solvent may be added during or after this mixing step, if necessary. The amount of water, as used in this case, depends upon such as the kind or particle diameter of the polymer as used, but is not larger than 10 parts by weight, preferably in the range of 0.1 to 10 parts by weight, more preferably 1 to 5 parts by weight, per 100 parts by weight of the solid content of the water-absorbent resin powder.

The hydrophilic organic solvent is not especially limited, but specific examples thereof include: lower alcohols such as methyl alcohol, ethyl alcohol, n-propyl alcohol, iso-propyl alcohol, n-butyl alcohol, iso-butyl alcohol, and t-butyl alcohol; ketones such as acetone; ethers such as dioxane and tetrahydrofuran; amides such N,N-dimethylformamide; and sulfoxides such as dimethyl sulfoxide.

When mixing the above polymer and surface-crosslinking agent together, for example, the polymer may be dispersed into the above aqueous liquid to then mix the resultant dispersion with the surface-crosslinking agent, or the surface-crosslinking agent may be dissolved into water or the aqueous liquid to then spraying or dropwise adding the resultant solution directly to the polymer, thereby mixing them together. In addition, in the case where the mixing step is carried out using water, there may coexist such as water-insoluble finely-particulate powders, various organic or inorganic acids, or surfactants. Of these mixing methods, the spray-mixing method is preferable, and in this method the aqueous liquid is added in the form of fine drops of preferably not larger than 500 µm, more preferably not larger than 300 µm.

In addition, in the case where the aqueous liquid is added in the present invention, the internal wall of the mixer preferably has a temperature higher than room temperature. It is preferable that the internal wall temperature of the mixer is maintained at not lower than 40° C., more preferably in the range of 45 to 100° C., still more preferably 50 to 95° C., yet still more preferably 55 to 90° C., and that the internal wall temperature is higher than the temperature of the water-absorbent resin powder to which the aqueous liquid has not been added yet, more preferably by within 40° C., still more preferably by within 20° C., particularly preferably by within 10° C. Incidentally, the term "internal wall" represents internal surfaces, including agitation blades, of the mixer. In the case of the continuous mixing, it is preferable that these temperatures are controlled to temperature in a stationary state, particularly, metal portions are necessarily controlled.

In the case where the internal wall temperature of the mixer is not higher than room temperature, even if the temperature of the powder is controlled there is a possibility that the water-absorbent resin powder to which the aqueous liquid has been added might adhere to the internal wall, or that the properties of the resultant water-absorbent resin powder might be deteriorated. In addition, in the case where the internal wall temperature is too high, there is a possibility that such as the crosslinking agent in the aqueous solution might lose its effects, or that the aqueous liquid might nonuniformly be mixed.

There is no especial limitation in the control of the internal wall temperature of the mixer if the control to the above-mentioned temperature is possible. The temperature may be controlled, for example, by a method (1) which involves external heating with a warm wind or heating medium, or the mixer itself may be structured so as to sufficiently heat-retain itself and then the internal wall temperature of the mixer may be controlled by a method (2) which involves continuously mixing a large amount (for example, not smaller than 500 kg/hr) of powder or aqueous liquid having a specific temperature, or by a method (3) which involves utilizing either hydration heat of the water-absorbent resin powder as generated by adding thereto the aqueous liquid or frictional heat as generated when mixing. These controlling methods may be used in combinations with each other, but the method (1) is preferably used.

Furthermore, as to these methods, it is preferable that the mixer having a specific internal wall temperature is a high-speed-stirring-type mixer with stirring blades. The mixer usually operates to perform stir-mixing at a revolution rate of not slower than 10 rpm, preferably in the range of 100 to 10,000 rpm, more preferably 300 to 5,000 rpm, most preferably 500 to 3,000 rpm. The stirring time is usually within 5 minutes, preferably within 3 minutes, more preferably within 1 minute, still more preferably within 0.2 minute. In addition, it is more preferable to use a gas-current-stirring-type mixer having a plurality of stirring blades as a mixer.

In the process according to the present invention, the improvement of properties due to the mixability improvement is great, therefore it is preferable that the aqueous liquid is an aqueous crosslinking agent solution and, for greatly displaying the effects of the present invention, it is particularly preferable that the aqueous crosslinking agent solution, which is conventionally difficult to mix with the water-absorbent resin, is an aqueous polyhydric alcohol solution (which further contains a crosslinking agent other than the polyhydric alcohol, if necessary), especially, an aqueous solution containing only the polyhydric alcohol as the crosslinking agent, and/or that the aqueous liquid contains no organic solvents other than the polyhydric alcohol, especially, no volatile organic solvents. In addition, in the case where the internal wall temperature of the mixer is raised, the addition of the aqueous liquid in the present invention can favorably be applied to crosslinking agents which are inactive even at the internal wall temperature, such as crosslinking agents having a reaction temperature of not lower than 110° C. which is necessary for reheating, particularly, polyhydric alcohols.

In addition, in the present invention, the polyhydric alcohol may be used as a crosslinking agent, or as a solvent for a crosslinking agent by being used at not higher than the reaction temperature of the polyhydric alcohol, or these functions may be combined. Incidentally, the crosslinking agent other than the polyhydric alcohol, as used, is exemplified by the aforementioned crosslinking agents and by the below-mentioned prior art documents. Examples of polyhydric alcohols which most greatly give the effects of the present invention in respect to properties include those which have 3 to 8 carbon atoms, particularly, glycerol, propylene glycol, butanediol, pentanediol, hexanediol (incidentally, the diol substituent position is not limited).

Incidentally, the volatile organic solvent, as referred to in the present invention, means solvents having a boiling point of not higher than the temperature at which the below-mentioned crosslinking reaction is carried out, particularly, organic solvents having a boiling point of not higher than 100° C., preferably not higher than 85° C. In the present invention, the addition of an aqueous liquid which involves no use of these organic solvents has the advantage of giving a water-absorbent resin which is also excellent in respect to environment, cost and safety.

In the present invention, after the above polymer and surface-crosslinking agent are mixed together, the surface vicinity of the polymer is crosslinked wherein this crosslinking is carried out by forcible heating if necessary according to the kind of the surface-crosslinking agent. The forcible heating temperature depends upon the kind of the surface-crosslinking agent, but is preferably not lower than 100° C., more preferably in the range of 110 to 230° C., still more preferably 160 to 220° C. The forcible heating time is fitly determined, but is preferably in the range of 1 to 120 minutes, more preferably 5 to 60 minutes. In addition, examples of the apparatus used for the forcible heating include: channel type blending dryers, rotary dryers, disk dryers, fluidized-bed dryers, air blow type dryers, and infrared dryers. Incidentally, these heating apparatuses are set separately from the aforementioned mixing apparatuses and preferably connected thereto.

Incidentally, the above surface-crosslinking methods are also disclosed in: various European patent publications, such as EP 0349240, EP 0605150, EP 0450923, EP 0812873, EP 0450924, and EP 0668080; various Japanese patents, such as JP-A-242709/1995 and JP-A-224304/1995; various U.S. patents, such as U.S. Pat. No. 5,409,771, U.S. Pat. No. 5,597,873, U.S. Pat. No. 5,385,983, U.S. Pat. No. 5,610,220, U.S. Pat. No. 5,633,316, U.S. Pat. No. 5,674,633, and U.S. Pat. No. 5,462,972; and various international patent publications, such as WO 99/42494, WO 99/43720, and WO 99/42496. These surface-crosslinking methods are also applicable to the reheating or the addition of the aqueous liquid in the present invention.

As is mentioned above, the present invention further provides a production process for a water-absorbent resin powder which comprises the steps of: polymerizing an aqueous monomer solution containing a crosslinking agent;

heat-drying the resultant crosslinked hydrogel polymer; pulverizing the resultant dry polymer; and adding an aqueous liquid to the resultant powder in a mixer; wherein:

the temperature of the heat-drying step is in the range of 110 to 230° C.; the dry polymer is cooled into the range of 80 to 35° C. before the addition of the aqueous liquid; and the dry polymer is adjusted so as to have a bulk density of not less than 0.65 g/ml after the pulverization step.

In addition, the present invention further provides a production process for a water-absorbent resin powder which comprises the steps of: polymerizing an aqueous monomer solution containing a crosslinking agent; heat-drying the resultant crosslinked hydrogel polymer; pulverizing the resultant dry polymer; and adding an aqueous liquid to the resultant powder in a mixer; wherein:

the temperature of the heat-drying step is in the range of 110 to 230° C.; the dry polymer is cooled into the range of 80 to 35° C. before the addition of the aqueous liquid; the mixer is a stirring mixer having an internal wall temperature of not lower than 40° C.; and the mixture resultant from the addition of the aqueous liquid is reheated into the range of 110 to 230° C.

Incidentally, in these two processes, the larger the temperature difference between the drying temperature and the cooling temperature is, the greater the effects of the present invention are. Such as the preferable temperature range is as aforementioned.

The absorption capacity of the water-absorbent resin powder, as obtained in the above way, under a load of 1.96 kPa or its absorption capacity without load (for physiological saline solution) is preferably not less than 25 g/g, more preferably not less than 27 g/g, still more preferably not less than 30 g/g, particularly preferably not less than 35 g/g. In addition, such as water-extractable content, particle diameter, bulk density, and water absorption capacity of this water-absorbent resin powder are in the aforementioned ranges.

Furthermore, the absorption capacity of the water-absorbent resin powder under a load of 4.9 kPa is preferably not less than 23 g/g, more preferably not less than 25 g/g, still more preferably not less than 27 g/g. In the present invention, the water-absorbent resin powder having such high properties can be produced easily and stably.

In addition, the present invention further provides a production process for a water-absorbent resin powder which comprises the steps of: polymerizing an aqueous monomer solution containing a crosslinking agent; heat-drying the resultant crosslinked hydrogel polymer; and pulverizing the resultant dry polymer; wherein:

the dry polymer is forcibly cooled after the heat-drying step;

the step of pulverizing the dry polymer is carried out so as to form a water-absorbent resin powder having a bulk density of not less than 0.65 g/ml; and the cooled water-absorbent resin powder is further surface-crosslinked.

In addition, the present invention further provides a production process for a water-absorbent resin powder which comprises the steps of: polymerizing an aqueous monomer solution containing a crosslinking agent; heat-drying the resultant crosslinked hydrogel polymer; and pulverizing the resultant dry polymer; wherein:

the dry polymer is forcibly cooled after the heat-drying step;

the step of pulverizing the dry polymer is carried out so as to form a water-absorbent resin powder having a bulk density of not less than 0.65 g/ml; and an aqueous liquid is further added to the cooled water-absorbent resin powder in a stirring mixer having a heated internal wall.

Accordingly, the present invention further provides a water-absorbent resin powder which is obtained by a process including the steps of: polymerizing an aqueous monomer solution containing a crosslinking agent; heat-drying the resultant crosslinked hydrogel polymer; pulverizing the resultant dry polymer; and adding an aqueous polyhydric alcohol solution to the resultant powder in a mixer wherein the aqueous polyhydric alcohol solution does not contain any volatile organic solvents; wherein the resultant water-absorbent resin powder has the following properties: (1) the bulk density is not less than 0.65 g/ml; (2) the average particle diameter is in the range of 200 to 600 $\mu$m; (3) the total ratio of particles having particle diameters of not larger than 150 $\mu$m and particles having particle diameters of not smaller than 850 $\mu$m in the water-absorbent resin powder is not more than 10 weight % of the water absorbent resin powder; and (4) the absorption capacity under a load (1.96 kPa) is not less than 25 g/g.

The present invention improves continuous mixability of the water-absorbent resin powder with the aqueous liquid. Therefore, even if the aqueous polyhydric alcohol solution (which would conventionally be difficult to mix with the powder but for volatile organic solvents as conventionally used) is used, the present invention can provide a water-absorbent resin powder which exhibits high absorption capacity under a load and has high bulk density.

Various functions may be given to the present invention water-absorbent resin powder, as obtained in the above way, by further adding thereto materials such as deodorants, antimicrobial agents, perfumes, various inorganic powders, foaming agents, pigments, dyes, hydrophilic short fibers, plasticizers, pressure sensitive adhesives, surfactants, manure, oxidants, reductants, chelating agents, antioxidants, water, aqueous polymers, binders, and salts, if necessary.

The water-absorbent resin powder, as obtained by involving the production process according to the present invention, has excellent particle diameter distribution and properties, and therefore can be modified into a water-absorbent resin powder which displays higher properties by such as surface-crosslinking or post-neutralization. In addition, in the present invention, such a water-absorbent resin powder can be obtained with high productivity and ease, and at a low energy cost and a moderate price without adhesion or aggregation in the production steps.

Therefore, the water-absorbent resin powder according to the present invention can be utilized for the wide range of uses, but is favorable particularly for sanitary materials and absorbent articles, such as disposable diaper and sanitary napkins, and can preferably be used as sanitary materials by being combined with hydrophilic fiber materials such as pulverized pulp. In addition, the water-absorbent resin powder according to the present invention has high properties and therefore can be used suitably for sanitary materials in which the core concentration (weight ratio of the water-absorbent resin powder to the total of the fiber and the water-absorbent resin powder) is high, for example, the concentration of the water-absorbent resin powder is in the range of 30 to 100 weight %, preferably 40 to 95 weight %, more preferably 50 to 90 weight %.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples. Incidentally, the performances of the water-absorbent resin powder were measured by the methods shown below. In addition, such as polymerization, drying, and pulverization in the examples were carried out by a series of continuous procedures which simulated actual production.

(a) Water Absorption Capacity Without Load

First, 0.200 g of water-absorbent resin powder was uniformly placed into a nonwoven-fabric-made bag (60 mm×60 mm), and then the bag was heat-sealed and then immersed into a great excess (about 200 g) of 0.9 weight % physiological saline solution at room temperature. Sixty minutes later than this immersion, the bag was drawn up and then drained at 250 G for 3 minutes with a centrifuge, and the resultant weight W1 (g) of the bag was then measured. On the other hand, the same procedure was carried out without the water-absorbent resin powder, and the resultant weight W0 (g) was measured. Thus, the water absorption capacity (g/g) without load was calculated from these weights W1 and W0 in accordance with the following equation (a):

$$\text{water absorption capacity (g/g) without load} = (\text{weight i W1 (g)} - \text{weight W0 (g)} - 0.2)/0.2 \text{ (g)}.$$

(b) Water-extractable Content

First, 1.000 g of water-absorbent resin powder was swollen and dispersed in 184.3 g of physiological saline solution, and then stirred in a beaker (capacity: 200 ml) for 16 hours. Thereafter, the resultant swollen gel was separated by filtration with a paper filter. Next, carboxyl groups in the resultant filtrate were subjected to neutralization titration with a 0.1 N (0.1 mol/l) aqueous sodium hydroxide solution and a 0.1 N (0.1 mol/l) aqueous hydrochloric acid solution, thereby calculating the amount of water-soluble polymer (=water-soluble poly(acrylic acid) (salt)) in the filtrate which water-soluble polymer had been extracted from the water-absorbent resin powder (swollen gel), namely, the water-extractable content (weight %) of the water-absorbent resin powder.

(c) Solid Content of Water-absorbent Resin

First, 1.000 g of water-absorbent resin powder, as obtained from the dry polymer, was placed into an aluminum-made cup (inner diameter 53 mm×height 23 mm) and then redried in a wind-free oven of 180° C. for 3 hours to calculate the solid content (weight %) of the water-absorbent resin powder (or dry polymer) from its weight loss (g) on drying. Incidentally, the solid content of the dry polymer was that of the pulverized one as measured in the same way as the above after the pulverization of the dry polymer.

(d) Particle Diameter Distribution and Average Particle Diameter

The water-absorbent resin powder was classified with JIS standard sieves (850 μm, 600 μm, 300 μm, and 150 μm), and then the weight of fractions having particle diameters corresponding to each sieve (850-μm-on fractions/fractions ranging from 850 to 600 μm/fractions ranging from 600 to 300 μm/fractions ranging from 300 to 150 μm/150-μm-passed fractions) was measured. In addition, another JIS standard sieve was added, if necessary, and then the measured particle diameter distribution was plotted on logarithmic probability paper to determine the weight-average particle diameter (D50).

(e) Absorption Capacity Under Load

In accordance with the methods as disclosed in the working examples portions of EP 0885917, EP 0817873, and EP 0811636, the absorption capacity of the water-absorbent resin powder for physiological saline solution under a load of 50 g/cm$^2$ (corresponding to about 4.90 kPa) was measured.

Namely, while a load of 50 g/cm$^2$ (about 4.90 kPa) was uniformly applied to 0.900 g of water-absorbent resin powder, the weight W2 (g) of the physiological saline solution as absorbed at room temperature by the water-absorbent resin powder over a period of 60 minutes was measured with a balance. Then, the water absorption capacity (g/g) under the load in 60 minutes from the absorption initiation was calculated from the above weight W2 in accordance with the following equation (b) to determine the absorption capacity (g/g) under the load of 50 g/cm$^2$ (about 4.90 kPa).

absorption capacity (g/g) under load=weight W2 (g)/weight (g) of water-absorbent resin powder    Equation (b):

Incidentally, in the case where the absorption capacity under a load was measured in the same way as the above except that the load was changed into 20 g/cm$^2$ (corresponding to about 1.96 kPa), the measured value was referred to as water absorption capacity under a load (1.96 kPa).

(f) Bulk Density

The bulk density was measured with a bulk density meter (made by Kuramochi Scientific Instrument Seisakusho K.K.) in accordance with JIS K3362 (incidentally, as to the bulk density measurement method, please also refer to European Patent Application No. 1029886 and Japanese Patent Application No. 035941/2000).

Namely, 120 g of water-absorbent resin powder was placed into a funnel with its damper closed in a room having a temperature of 25±2° C. and a relative humidity of 30 to 50%. Immediately thereafter, the damper was opened to drop the sample into a receiver (capacity: 100 ml). A portion, as overbrimmed from the receiver, of the sample was scraped off with a glass rod. Then, the weight (g) of the receiver containing the sample was measured with an accuracy to 0.1 g to calculate the bulk density (g/ml).

(g) Impact Resistance

In accordance with EP 0817873 (U.S. Pat. No. 6,071,976), 30.0 g of water-absorbent resin powder was placed into a glass vessel and then vibrated along with 10.0 g of glass beads for 30 minutes to evaluate the decrease of the absorption capacity under load, thus measuring the impact resistance of the water-absorbent resin powder.

(h) Weight-Average Particle Diameter of Crosslinked Hydrogel Polymer

The particle diameter distribution was measured by using a 20 weight % aqueous sodium chloride solution with which only a slight portion of the crosslinked hydrogel polymer (hydrogel) is swollen and shrunk. Namely, 30 g of the hydrogel was dispersed into 1,000 g of the 20 weight % aqueous sodium chloride solution and then stirred at 300 rpm by a stirrer chip for 2 hours. Two hours later, the resultant dispersion was placed into with six-piled JIS standard sieves (mesh opening sizes: 9,500 μm, 2,000 μm, 850 μm, 600 μm, 300 μm, and 75 μm/JIS Z8801/stainless sieves/inner diameter: 20 cm) to classify the hydrogel further using 6,000 g of the 20 weight % aqueous sodium chloride solution by pouring this onto the hydrogel in sequence. Next, the bottoms of the sieves was sufficiently drained with paper, and then the weights of the classified portions having their respective particle diameter ranges of the hydrogel were measured and, from their total weight (g) and the initial weight (30 g) of the hydrogel, the swelling capacity was determined and then converted into what each particle diameter (μm) range had been before the above swelling. The results of this conversion was plotted on logarithmic probability paper to determine the weight-average particle diameter D50 of the hydrogel.

Production Example 1

Polymerization and Drying of Unneutralized Crosslinked Poly(acrylic Acid

First, an aqueous monomer solution (1), comprising 1,066.61 g of acrylic acid, 9.12 g of N,N'-methylenebisacrylamide (copolymerizable crosslinking agent), and 4,280.11 g of water, was degassed with nitrogen gas for 60 minutes and then charged into an airtight polymerization vessel possible to open and close.

Next, while the space in the vessel was put under a nitrogen flow, a polymerization initiator comprising 32.27 g of 10 weight % aqueous 2,2'-azobis (2-amidinopropane) dihydrochloride solution, 10.66 g of 10 weight % aqueous hydrogen peroxide solution, and 26.64 g of 1 weight % aqueous L-ascorbic acid solution was added into the vessel at a liquid temperature of 23° C. As a result, polymerization started after about 5 minutes, and then static polymerization was carried out for 1 hour. The resultant polymer was got out of the vessel and then finely divided into particles of several millimeters with a meat chopper having a die diameter of 7.5 mm (made by Hiraga Seisakusho Co., Ltd.), thus obtaining a particulate crosslinked hydrogel polymer (1) having an average particle diameter of 1,500 μm.

Next, the particulate crosslinked hydrogel polymer (1) was spread onto a metal gauze with a mesh opening size of 300 μm to form a laminate of about 50 mm in thickness. Then, the hydrogel was hot-wind-dried by passing a hot wind of 135° C. (dew point: 65° C.) at a speed of 1 m/s through the hydrogel in its vertical direction for 1 hour, thus obtaining a block-shaped material comprising a particulate dry polymer (1) having a solid content of 95 weight %. The material temperature thereof was about 135° C.

Production Example 2

Polymerization and Drying of Partially-neutralized Crosslinked Poly(acrylic Acid)

First, an aqueous monomer solution (2), comprising 673.79 g of acrylic acid, 5,904.7 g of 37 weight % aqueous sodium acrylate solution, 15.87 g of polyethylene glycol diacrylate (average number of polyethylene glycol units: 8) (internal-crosslinking agent), and 714.2 g of water, was degassed with nitrogen gas for 60 minutes and then supplied into a reactor as prepared by lidding a jacketed stainless-steel-made twin-arm kneader of 10 liters in capacity having two sigma type blades. While maintaining the solution at 20° C., the displacement of the internal air of the reaction system with nitrogen was continued.

Next, while the blades were rotated, 19.55 g of 20 weight % aqueous sodium persulfate solution and 1.47 g of 1.0 weight % aqueous L-ascorbic acid solution were added into the reactor. As a result, after 1 minute, polymerization started, and after 20 minutes, the reaction system reached its peak temperature, when the resultant crosslinked hydrogel polymer had a finely divided diameter of about 5 mm. Thereafter, this polymer was further stirred and then, after 60 minutes from the start of the polymerization, the resultant particulate crosslinked hydrogel polymer (2) having an average particle diameter of 1,600 μm was got out.

Next, the particulate crosslinked hydrogel polymer (2) was spread onto a metal gauze with a mesh opening size of 300 μm to form a laminate of about 50 mm in thickness. Then, the hydrogel was hot-wind-dried by passing a hot wind of 170° C. (dew point: 50° C.) at a speed of 1 m/s through the hydrogel in its vertical direction for 1 hour, thus obtaining a block-shaped material comprising a particulate dry polymer (2) having a solid content of 95 weight %. The material temperature thereof was about 170° C.

Production Example 3

Polymerization and Drying of Partially-neutralized Crosslinked poly(acrylic Acid)

A particulate crosslinked hydrogel polymer (3) having an average particle diameter of 1,700 μm was obtained by carrying out aqueous solution polymerization in a kneader in the same way as of Production Example 2 except that an aqueous monomer solution (3), comprising 425.1 g of acrylic acid, 4,497.2 g of 37 weight % aqueous sodium acrylate solution, 1.40 g of trimethylolpropane triacrylate (internal-crosslinking agent), and 577.7 g of water, was used instead of the aqueous monomer solution (2).

Next, the particulate crosslinked hydrogel polymer (3) was hot-wind-dried at 170° C. for 1 hour in the same way as of Production Example 2, thus obtaining a block-shaped material comprising a particulate dry polymer (3) having a solid content of 95 weight %. The material temperature thereof was about 170° C.

Production Example 4

Polymerization and Drying of Partially-neutralized Crosslinked poly(acrylic Acid)

A particulate crosslinked hydrogel polymer (4) having an average particle diameter of 1,700 μm was obtained by carrying out aqueous solution polymerization in a kneader in the same way as of Production Example 2 except that an aqueous monomer solution (4), comprising 369 g of acrylic acid, 3,907 g of 37 weight % aqueous sodium acrylate solution, 4.99 g of polyethylene glycol diacrylate (average number of polyethylene glycol units: 8) (internal-crosslinking agent), and 1,216 g of water, was used instead of the aqueous monomer solution (2).

Next, the particulate crosslinked hydrogel polymer (4) was continuously hot-wind-dried in the same way as of Production Example 2, thus obtaining a block-shaped material comprising a particulate dry polymer (4) having a solid content of 95 weight %. The material temperature thereof was about 170° C.

Production Example 5

Polymerization and Drying of Partially-neutralized Crosslinked poly(acrylic Acid)

First, 100 parts of acrylic acid, 656.4 parts of 37 weight % aqueous sodium acrylate solution, 0.77 part of polyethylene glycol diacrylate (average number of polyethylene glycol units: 8), and 216.7 parts of deionized water were mixed enough to prepare an aqueous monomer solution (5). The resultant aqueous monomer solution (5) was continuously fed at a rate of 290 kg/h by using a metering pump, while the oxygen concentration of the aqueous monomer solution (5) was adjusted to not more than 0.5 ppm by continuously introducing nitrogen gas into a way of piping. Four kinds of aqueous initiator solutions, containing 0.08 parts (as initiator solid content) of 2,2'-azobis(2-amidinopropane) dihydrochloride (trade name: V-50, made by Wako Pure Chemical Industries, Ltd.), 0.08 parts (as initiator solid content) of sodium persulfate, 0.008 parts (as initiator solid content) of L-ascorbic acid, and 0.006 parts (as initiator content) of hydrogen peroxide respectively, were further line-mixed with the aqueous monomer solution (5) in order, and then the resultant mixture was continuously supplied into a steel endless-belt polymerization machine (flat belt having a dam of 50 mm at both edges), which was moving at a speed of 12 cm/min, so that the thickness of the mixture might be 25 mm. Polymerization started at once, and then the resultant polymer was discharged from an end of the belt polymerization machine, and then cut into pieces of about 5 to about 10 cm with a continuous cutter, and then pulverized with a meat chopper (die diameter: 9 mm), thus obtaining a particulate crosslinked hydrogel polymer (5) having an average particle diameter of 1,600 µm.

Next, the particulate crosslinked hydrogel polymer (5) was placed onto a punching metal in a thickness of 50 mm and then continuously hot-wind-dried (by passing a hot wind of 180° C. (dew point: 60° C.) through the polymer in a vertical direction for 20 minutes) with a belt type dryer, thus obtaining a block-shaped material comprising a particulate dry polymer (5) having a solid content of 94 weight %. The material temperature thereof was about 180° C.

EXAMPLE 1

Forcible Cooling of Dry Polymer (1) to 60° C.

A cold wind (speed: 1 m/s) of room temperature instead of the hot wind was passed through the block-shaped material of the particulate dry polymer (1) (material temperature: about 135° C., as obtained in Production Example 1) in a vertical direction, thereby forcibly cooling the block-shaped material of the particulate dry polymer (1) to 60° C. The resultant block-shaped aggregate on the metal gauze was disintegrated immediately after being got out of the wind-cooling apparatus. The resultant particulate dry material (1) was continuously pulverized within 30 seconds by a three-stage roll granulator (roll setting gaps: 1.0 mm/0.45 mm/0.25 mm in order from the top). The releasability of the block-shaped material of the dry polymer (1) from the metal gauze having a mesh opening size of 300 µm was very good during the drying step, and the particle diameter distribution of a water-absorbent resin powder (1) as obtained by the above pulverization is shown in Table 1.

EXAMPLE 2

Forcible Cooling of Dry Polymer (1) to 45° C.

The block-shaped material was forcibly cooled to 45° C. by adjusting the passing time of the cold wind in Example 1. Thereafter, in the same way as of Example 1, the cooled material was disintegrated, and then the resultant particulate dry material (2) was pulverized. The releasability of the block-shaped material of the dry polymer (1) from the metal gauze having a mesh opening size of 300 µm was very good during the drying step, and the particle diameter distribution of a water-absorbent resin powder (2) as obtained by the above pulverization is shown in Table 1.

EXAMPLE 3

Forcible Cooling of Dry Polymer (1) to 95° C.

The block-shaped material was forcibly cooled to 95° C. by adjusting the passing time of the cold wind in Example 1. Thereafter, in the same way as of Example 1, the cooled material was disintegrated, and then the resultant particulate dry material (3) was pulverized. The releasability of the block-shaped material of the dry polymer (1) from the metal gauze having a mesh opening size of 300 µm was a little worse than that in Example 1 or 2, but good during the drying step, and the particle diameter distribution of a water-absorbent resin powder (3) as obtained by the above pulverization is shown in Table 1.

EXAMPLE 4

Forcible Cooling of Dry Polymer (1) to 80° C.

The block-shaped material was forcibly cooled to 80° C. by adjusting the passing time of the cold wind in Example 1. Thereafter, in the same way as of Example 1, the cooled material was disintegrated, and then the resultant particulate dry material (4) was pulverized. The releasability of the block-shaped material of the dry polymer (1) from the metal gauze having a mesh opening size of 300 µm was a little worse than that in Example 1 or 2, but good during the drying step, and the particle diameter distribution of a water-absorbent resin powder (4) as obtained by the above pulverization is shown in Table 1.

EXAMPLE 5

Forcible Cooling of Dry Polymer (2) to 40° C.

A cold wind (speed: 1 m/s) of room temperature instead of the hot wind was passed through the block-shaped material of the particulate dry polymer (2) (material temperature: about 170° C., as obtained in Production Example 2) in a vertical direction, thereby forcibly cooling the block-shaped material of the particulate dry polymer (2) to 40° C. The resultant block-shaped aggregate on the metal gauze was disintegrated immediately after being got out of the wind-cooling apparatus. The resultant particulate dry material (5) was continuously pulverized within 30 seconds by a three-stage roll granulator (roll setting gaps: 1.0 mm/0.45 mm/0.25 mm in order from the top). The releasability of the block-shaped material of the dry polymer (2) from the metal gauze having a mesh opening size of 300 µm was very good during the drying step, and the particle diameter distribution of a water-absorbent resin powder (5) as obtained by the above pulverization is shown in Table 1.

EXAMPLE 6

Adding Aqueous Liquid and Reheating

A surface-crosslinking agent solution with a composition of 1,4-butanediol/propylene glycol/water/isopropanol=0.32/0.50/2.73/0.45 (parts by weight) was mixed into 100 parts by weight of the water-absorbent resin powder (5) (as obtained by the process involving the forcible cooling step) at a powder temperature of 35° C., and then the resultant mixture was reheated at 210° C. for 30 minutes, thus obtaining a surface-crosslinked water-absorbent resin powder (6), which exhibited a water absorption capacity of 28 g/g without load and a water absorption capacity of 25 g/g under a load (4.90 kPa).

Incidentally, the water-absorbent resin powder (5) as obtained in example 5 was measured by the water absorption capacity without load and the water-extractable content, with the result that they were 31 g/g and 5 weight % respectively. In addition, the bulk density and the temperature of the water-absorbent resin powder (5) were 0.67 g/ml and 35° C. respectively before the addition of the aqueous liquid.

EXAMPLE 7

Post-neutralization

The water-absorbent resin powder (7) of 75 mol % in neutralization ratio was obtained by dry blending (powder mixing) of the water-absorbent resin powder (1), as obtained in Example 1, and a predetermined amount of sodium carbonate powder together in order to post-neutralize carboxyl groups. As to the water-absorbent resin powder (7), the water absorption capacity without load was 42 g/g, and the water-extractable content was 3 weight %.

Furthermore, the water-absorbent resin powders (2) to (4) as obtained in Examples 2 to 4 were also post-neutralized in the same way as the above. As a result, they exhibited a water absorption capacity of 42 g/g without load and had a water-extractable content of 3 weight %.

Comparative Example 1

No Forcible Cooling

The block-shaped material of the dry polymer (1) as obtained in Production Example 1 was got out of the dryer without passing the cold wind through the block-shaped material in Example 1. Immediately thereafter, in the same way as of Example 1, the block-shaped material was disintegrated, and then the resultant comparative particulate dry material (1) (temperature during pulverization: 120° C.) was pulverized. During the drying step, the releasability of the block-shaped material of the dry polymer (1) from the metal gauze having a mesh opening size of 300 μm was bad, and clogging of the metal gauze with particles of the dry polymer (1) was seen. Therefore, as the continuous drying proceeded, the drying efficiency (uniformity and drying speed) was decreasing. The particle diameter distribution of a comparative water-absorbent resin powder (1) as obtained by the above pulverization is shown in Table 1.

Comparative Example 2

No Forcible Cooling

The block-shaped material of the dry polymer (2) as obtained in Production Example 2 was got out of the dryer without passing the cold wind through the block-shaped material in Example 5. Immediately thereafter, in the same way as of Example 1, the block-shaped material was disintegrated, and then the resultant comparative particulate dry material (2) (temperature during pulverization: 120° C.) was pulverized. During the drying step, the releasability of the block-shaped material of the dry polymer (2) from the metal gauze having a mesh opening size of 300 μm was bad, and clogging of the metal gauze with particles of the dry polymer (2) was seen. Therefore, as the continuous drying proceeded, the drying efficiency (uniformity and drying speed) was decreasing. The particle diameter distribution of a comparative water-absorbent resin powder (2) as obtained by the above pulverization is shown in Table 1.

Comparative Example 3

Adding Aqueous Liquid and Post-heating/But No Forcible Cooling

The aqueous liquid was added to the comparative water-absorbent resin powder (2), as obtained in Comparative Example 2 (without forcible cooling of the dry polymer (2)), in the same way as of Example 6 (involving forcible cooling of the dry polymer (2)). As to the comparative water-absorbent resin powder (2) as obtained without cooling to 35 to 80° C., even if the particle diameter distribution was adjusted to the same as of the water-absorbent resin powder (5), aggregation and adhesion in the mixer were gradually observed and the continuous mixing was difficult, because of high temperature of the powder.

EXAMPLE 8

Forcible Cooling of Dry Polymer (3)

A cold wind (speed: 1 m/s) of room temperature instead of the hot wind was passed through the block-shaped material of the particulate dry polymer (3) (material temperature: about 170° C., as obtained in Production Example 3) in a vertical direction, thereby forcibly cooling the block-shaped material of the particulate dry polymer (3) to 50° C. The resultant block-shaped aggregate on the metal gauze was disintegrated immediately after being got out of the wind-cooling apparatus. The resultant particulate dry material (6) was continuously pulverized within 30 seconds by a three-stage roll granulator (roll setting gaps: 1.0 mm/0.45 mm/0.10 mm in order from the top). The releasability of the block-shaped material of the dry polymer (3) from the metal gauze having a mesh opening size of 300 μm was very good during the drying step, and the particle diameter distribution of a water-absorbent resin powder (8) as obtained by the above pulverization is shown in Table 1. Incidentally, as to the water-absorbent resin powder (8), the water absorption capacity without load was 44 g/g, and the water-extractable content was 17 weight %.

EXAMPLE 9

Forcible Cooling of Dry Polymer (3) and Change of Pulverization Conditions

The pulverization conditions of the dry polymer (6) in Example 8 were changed. Namely, a water-absorbent resin powder (9) was obtained by pulverizing the particulate dry material (6) with a pin mill (sample mill KII-1, made by Fuji Paudal Industry) (so that the ratio of particles having particle diameters in the range of 850 to 150 μm would be 85 weight %) and then grinding surfaces thereof with a homogenizer (high-speed homogenizer MX-7, made by Nihonseiki Kaisha Ltd.). The particle diameter distribution is shown in Table 1.

EXAMPLE 10

Adding Aqueous Liquid to Water-absorbent Resin Powder Having Bulk Density of 0.74 g/ml An aqueous liquid with a composition of propylene glycol/water/ethanol=0.3/2.5/1 (parts by weight) was spray-added to 100 parts by weight of water-absorbent resin powder (9A) (bulk density=0.74 g/ml) (which was obtained by classifying the water-absorbent resin powder (9) into the particle diameter range of 300 to 150 μm and had a temperature of 40° C. wherein the water-absorbent resin powder (9) was obtained in Example 9) in a high-speed mixer, and then the resultant mixture was heat-treated with an oil bath of 210° C. under stirred conditions for 30 minutes, thus obtaining a surface-crosslinked water-absorbent resin powder (10), of which the absorption capacities without load and under loads (1.96 kPa and 4.90 kPa) are shown in Table 2. In this table, the values of the absorption capacities under the loads, after the impact resistance test, are shown in the parentheses.

EXAMPLE 11

Adding Aqueous Liquid to Water-absorbent Resin Powder Having Bulk Density of 0.63 g/ml In the same way as of Example 10, the aqueous liquid was added to a water-absorbent resin powder (8A) (bulk density=0.63 g/ml) (which was obtained by classifying the water-absorbent resin powder (8) into the particle diameter range of 300 to 150 μm and had a temperature of 40° C. wherein the water-absorbent resin powder (8) was obtained in Example 8), and then the resultant mixture was heat-treated for 30 minutes. The results of analyzing the resultant water-absorbent resin powder (11) are shown in Table 2.

EXAMPLE 12

Adding Aqueous Liquid to Water-absorbent Resin Powder Having Bulk Density of 0.73 g/ml In the same way as of Examples 10 and 11, the aqueous liquid was added to 100 parts by weight of water-absorbent resin powder (9B) (bulk density=0.73 g/ml) (which was obtained by classifying the water-absorbent resin powder (9) into the particle diameter range of 500 to 150 μm and had a temperature of 40° C. wherein the water-absorbent resin powder (9) was obtained in Example 9), and then the resultant mixture was heat-treated for 25 minutes. The results of analyzing the resultant water-absorbent resin powder (12) are shown in Table 2.

EXAMPLE 13

Adding Aqueous Liquid to Water-absorbent Resin Powder Having Bulk Density of 0.63 g/ml In the same way as of Examples 10 to 12, the aqueous liquid was added to a water-absorbent resin powder (8B) (bulk density=0.63 g/ml) (which was obtained by classifying the water-absorbent resin powder (8) into the particle diameter range of 500 to 150 μm and had a temperature of 40° C. wherein the water-absorbent resin powder (8) was obtained in Example 8), and then the resultant mixture was heat-treated for 25 minutes. The results of analyzing the resultant water-absorbent resin powder (13) are shown in Table 2.

EXAMPLE 14

Forcible Cooling of Dry Polymer (4)

A cold wind (speed: 1 m/s) of room temperature instead of the hot wind was passed through the block-shaped material of the particulate dry polymer (4) (material temperature: about 170° C., as obtained in Production Example 4) in a vertical direction, thereby forcibly cooling the block-shaped material of the particulate dry polymer (3) to 65° C. The resultant block-shaped aggregate on the metal gauze was disintegrated immediately after being got out of the wind-cooling apparatus. The resultant particulate dry material (8) was continuously pulverized within 30 seconds by a three-stage roll granulator (roll setting gaps: 1.0 mm/0.45 mm/0.09 mm in order from the top). Incidentally, the releasability of the block-shaped material of the dry polymer (4) from the metal gauze having a mesh opening size of 300 μm was very good during the drying step. As to the resultant water-absorbent resin powder (14), the water absorption capacity without load was 43 g/g, and the water-extractable content was 10 weight %, and the particle diameter distribution is shown in Table 1.

EXAMPLE 15

Adding Aqueous Liquid and Post-heating/Powder Temperature=60° C.

In a Lödige mixer (M5R, made by Gebrüder Lödige Maschinenbau GmbH) of which the internal wall temperature was controlled to 60° C. by external heating, an aqueous solution with a composition of ethylene glycol diglycidyl ether/propylene glycol/water=0.1/3/1 (weight %) was mixed into 500 g of the water-absorbent resin powder (14) (which was obtained in Example 14 and had a temperature of 60° C.) at a high speed (revolution rate: 320 rpm), when and the mixing could continuously be carried out involving little adhesion of the water-absorbent resin powder even without an organic solvent. Then, the resultant mixture was heated while being stirred with a 5 L mortar mixer (made by Nishi Nihon Seisakusho K.K.) in an oil bath of 205° C. for 50 minutes, thus obtaining a surface-crosslinked water-absorbent resin powder (15). The results are shown in Table 2.

EXAMPLE 16

Adding Aqueous Liquid and Post-heating/Powder Temperature=40° C.

The water-absorbent resin powder (14) (which was obtained in Example 14 and had a temperature of 60° C.) was cooled to a temperature of 40° C. by continuous wind-cooling. Thereafter, in the same way as of Example 15, the aqueous liquid was added to the resultant water-absorbent resin powder (14) having a temperature of 40° C. As a result, the adhesion to the mixer more decreased. The resultant mixture was heat-treated in the same way as of Example 12, thus obtaining a water-absorbent resin powder (16). The results by analysis are shown in Table 2.

EXAMPLE 17

Adding Aqueous Liquid and Post-heating/Internal Wall Temperature Having Room Temperature The aqueous liquid was added in the same way as of Example 14 except that the temperature of the mixer was room temperature by no external heating. As a result, the adhesion to the internal wall greatly increased to deteriorate the continuous operability.

EXAMPLE 18

Forcible Cooling of Dry Polymer (5)

A cold wind (speed: 1 m/s) of room temperature instead of the hot wind was continuously supplied to the block-shaped material of the particulate dry polymer (5) (material temperature: about 180° C., as obtained in Production Example 5) in a vertical direction, thereby forcibly cooling the block-shaped material of the particulate dry polymer (5) to 60° C. Thereafter, the dry polymer (5) was got out of the endless belt type wind-cooling apparatus and then continuously supplied to a roll pulverizer at a rate of 100 kg/h to thereby carry out continuous polymerization, continuous drying, and continuous pulverization. The releasability of the dry polymer (5) from the punching metal was very good during the drying step, and the particle diameter distribution of a water-absorbent resin powder (18) as obtained by the above pulverization is shown in Table 1. As to the water-absorbent resin powder (18), the water absorption capacity without load was 55 g/g, and the water-extractable content was 6 weight %.

In addition, the cold wind, as used for the forcible cooling of the block-shaped material of the particulate dry polymer (5), was heated to about 90° C. due to this use for the forcible cooling, therefore the resultant warm wind was supplied to an air-supplying inlet of the belt type hot-wind dryer of Production Example 5 through piping to recycle the warm wind as a raw material of a hot wind (180° C.) for drying, thereby carrying out the continuous drying of Production Example 5. In this way, in the hot-wind drying of Production Example 5, the hot wind of 180° C. is produced by using the warm wind of about 90° C. instead of air of room temperature, therefore there are advantages in that energy is greatly saved at that rate, and in that the warm gas (exhaust gas) is not discharged into the environment.

EXAMPLE 19

Adding Aqueous Liquid and Post-heating/Powder Temperature=50° C.

The water-absorbent resin powder (18), as obtained by undergoing the forcible cooling, was supplied at a powder temperature of 50° C. to a high-speed continuous mixer (turbilizer/1,000 rpm) at a rate of 100 kg/h. Furthermore, an aqueous surface-crosslinking agent solution with a composition of 1,4-butanediol/propylene glycol/water/isopropanol=0.32/0.50/2.73/0.5 (weight % based on the powder) was sprayed to the water-absorbent resin powder (18) under conditions of spray diameter=about 250 μm. Next, the resultant mixture was continuously reheat-treated at 195° C. for 40 minutes, thus obtaining a surface-crosslinked water-absorbent resin powder (19). The results are shown in Table 2. Incidentally, the internal wall temperature of the high-speed continuous mixer (turbilizer) during the continuous mixing was in the range of about 70 to about 80° C. due to the powder temperature and the frictional heat, and the powder was therefore heated, with the result that there occurred little adhesion.

EXAMPLE 20

Adding Aqueous Liquid and Post-heating/Powder Temperature=50° C.

A surface-crosslinked water-absorbent resin powder (20) was obtained in the same way as of Example 19 except that: the aqueous surface-crosslinking agent solution was changed to an aqueous surface-crosslinking agent solution with a composition of ethylene glycol diglycidyl ether/propylene glycol/water/isopropanol=0.03/1/3/0.9 (weight % based on the powder) to spray this solution to the water-absorbent resin powder (18), and then the resultant mixture was continuously reheat-treated at 190° C. for 35 minutes. The results are shown in Table 2.

EXAMPLE 21

Adding Aqueous Liquid and Post-heating/Powder Temperature=30° C.

The water-absorbent resin powder (18), as obtained in Example 18, was further cooled to a powder temperature of 30° C. and then mixed with the aqueous surface-crosslinking agent solution in the same way as of Example 19, and then the resultant mixture was continuously reheat-treated at 195° C. for 40 minutes. Because of the cooling to the powder temperature of 30° C., a long term operation resulted in a little aggregation during the continuous mixing and transportation, and in a little prolongation of the reaction time. The results are shown in Table 2.

Comparative Example 4

Adding Aqueous Liquid and Post-heating/But No Forcible Cooling

A comparative water-absorbent resin powder (3) was obtained in the same way as of Example 14 except that the dry polymer (4) was got out of the dryer without being forcible cooled, and immediately thereafter pulverized. Next, the aqueous liquid was added to the water-absorbent resin powder in the same way as of Example 15 except that the water-absorbent resin powder (14) was replaced with the comparative water-absorbent resin powder (3) of which the particle diameter distribution was adjusted to not larger than 850 μm. As to the comparative water-absorbent resin powder (3) as obtained without cooling to 40 to 80° C., even if the particle diameter distribution was adjusted to the same as of Example 15, aggregation and adhesion in the mixer were gradually observed and the continuous operation was difficult. The results are shown in Table 2.

Comparative Example 5

Pulverization of Dry Polymer (5)/But No Forcible Cooling

The dry polymer (5) was treated in the same way as of Example 18 except that the dry polymer (5) was not forcibly cooled before being supplied to the roll pulverizer. After 2 hours from the start of the continuous pulverization, there began to occur the following troubles: aggregate-derived extraordinary noises of the pulverizer; and adhesion of the aggregate to the pulverizer. The particle diameter distribution of a comparative water-absorbent resin powder (5) as obtained by the pulverization is shown in Table 1.

Comparative Example 6

Adding Aqueous Liquid and Post-heating/But No Forcible Cooling

A comparative surface-crosslinked water-absorbent resin powder (6) was obtained in the same way as of Example 19 except that the water-absorbent resin powder (19) was replaced with the comparative water-absorbent resin powder (5) as obtained in Comparative Example 5. The results are shown in Table 2.

EXAMPLE 22

Preparation of Sanitary Material

First, 50 parts by weight of the surface-crosslinked water-absorbent resin powder (19) (as obtained in Example 19) and 50 parts by weight of pulverized wood pulp were mixed together in a dry manner with a mixer. Next, the resultant mixture was shaped into a web of the size of 12 cm×38 cm by pneumatically molding the mixture. Then, this web was pressed under a pressure of 2 kg/cm$^2$ (about 193 kPa), thus obtaining an absorbent structure (1) having a basis weight of about 526 g/m$^2$. Next, this absorbent structure (1) was inserted between a back sheet (liquid-impermeable sheet) with a leg gather and a liquid-permeable top sheet, thus preparing a disposable diaper (1) having a weight of 47 g and a core concentration of 50 weight %.

While a load of 20 g/cm$^2$ (about 1.93 kPa) was applied to the disposable diaper (1) by a flat-plate-shaped weight, a physiological saline solution was injected from a central hole of the plate into the disposable diaper under the load. As a result, the disposable diaper (1), which was prepared from the water-absorbent resin powder (19) as obtained by undergoing the cooling step, exhibited a saturated absorbency of about 470 g.

Comparative Example 7

Preparation of Sanitary Material

A comparative disposable diaper (1) was obtained in the same way as of Example 22 except that the water-absorbent resin powder (19) was replaced with the comparative water-absorbent resin powder (6) as obtained in Comparative Example 6. In the same way as of Example 22, while a load of 20 g/cm² (about 1.93 kPa) was applied to the comparative disposable diaper (1) by a flat-plate-shaped weight, a physiological saline solution was injected from a central hole of the plate into the disposable diaper under the load. As a result, the comparative disposable diaper (1) exhibited a saturated absorbency of about 410 g and was therefore inferior to the disposable diaper (1) which was prepared from the water-absorbent resin powder (19) as obtained by undergoing the cooling step.

TABLE 1

Particle diameter distribution and drying efficiency of water-absorbent resin powder

| Example or Comparative Example | Dry polymer | Temperature (° C.) | Releasability (⊚ to X) | 850-on | 850–600 | 600–300 (weight %) | 300–150 | 150-passed | Average particle diameter (μm) |
|---|---|---|---|---|---|---|---|---|---|
| Example 1 | (1) | 60 | ⊚ | 0 | 17 | 66 | 15 | 2 | 420 |
| Example 2 | (1) | 45 | ⊚ | 3 | 16 | 72 | 8 | 1 | 460 |
| Example 3 | (1) | 95 | ○ | 14 | 26 | 56 | 4 | 0 | 540 |
| Example 4 | (1) | 85 | ○ | 10 | 24 | 61 | 5 | 0 | 520 |
| Example 5 | (2) | 40 | ⊚ | 0 | 13 | 74 | 11 | 1 | 420 |
| Example 8 | (3) | 40 | ⊚ | 0 | 14 | 62 | 18 | 6 | 390 |
| Example 9 | (3) | 40 | ⊚ | 0 | 9 | 37 | 32 | 22 | 270 |
| Example 14 | (4) | 50 | ⊚ | 0 | 3 | 47 | 43 | 7 | 300 |
| Example 18 | (5) | 50 | ⊚ | 0 | 14 | 62 | 19 | 5 | 390 |
| Comparative Example 1 | (1) | 120 | X | 75 | 20 | 5 | 0 | 0 | 1,100 |
| Comparative Example 2 | (2) | 120 | X | 24 | 31 | 30 | 11 | 4 | 640 |
| Comparative Example 5 | (5) | 140 | X | 7 | 31 | 40 | 18 | 4 | 490 |

There is forcible cooling before pulverization in Examples 1 to 5, 8, 9, 14 and 18 above.
There is no forcible cooling before pulverization in Comparative Examples 1, 2 and 5 above.
(Notes)
Table 1:
Releasability: releasability of dry polymer from metal gauze (drying efficiency)
⊚ (Very good releasability/neither clogging nor adhesion to metal gauze)
○ (Good releasability/a little clogging and adhesion to metal gauze)
Δ (Somewhat bad releasability/clogging and adhesion to metal gauze)
X (Bad releasability/much clogging and adhesion to metal gauze)

TABLE 2

Pulverization of dry polymers (2) to (5) and addition of aqueous liquid

| Example or Comparative Example | Powder temperature (° C.) | Particle diameter range (μm) | Bulk density (g/ml) | Water absorption capacity without load (g/g) | Absorption capacity under load 4.90 kPa (g/g) | Absorption capacity under load 1.96 kPa (g/g) |
|---|---|---|---|---|---|---|
| Example 10 | 40 | 300–150 | 0.74 | 35 | 24 (23) | 35 (34) |
| Example 11 | 40 | 300–150 | 0.63 | 36 | 18 (16) | 34 (31) |
| Example 12 | 40 | 500–150 | 0.76 | 37 | 25 (23) | 35 (34) |
| Example 13 | 40 | 500–150 | 0.63 | 39 | 20 (17) | 35 (31) |

The above is comparison of dry polymer (3).

| | | | | | | |
|---|---|---|---|---|---|---|
| Example 6 | 35 | not larger than 850 | 0.67 | 28 | 25 | 28 |
| Comparative Example 3 | No cooling | not larger than 850 | 0.67 | 29 | 19 | 26 |

The above is comparison of dry polymer (2).
(Comparative Example 3: much aggregation and adhesion/difficult continuous mixing)

| | | | | | | |
|---|---|---|---|---|---|---|
| Example 15 | 60 | not larger than 850 | 0.68 | 32 | 25 | 30 |
| Example 16 | 40 | not larger than 850 | 0.68 | 31 | 27 | 32 |
| Comparative Example 4 | No cooling | not larger than 850 | 0.68 | 33 | 19 | 27 |

The above is comparison of dry polymer (4).
(Comparative Example 4: much aggregation and adhesion/difficult continuous mixing)

TABLE 2-continued

Pulverization of dry polymers (2) to (5) and addition of aqueous liquid

| Example or Comparative Example | Powder temperature (° C.) | Particle diameter range (μm) | Bulk density (g/ml) | Water absorption capacity without load (g/g) | Absorption capacity under load | |
|---|---|---|---|---|---|---|
| | | | | | 4.90 kPa (g/g) | 1.96 kPa (g/g) |
| Example 19 | 50 | not larger than 850 | 0.67 | 35 | 27 | 35 |
| Example 20 | 50 | not larger than 850 | 0.67 | 34 | 28 | 34 |
| Example 21 | 30 | not larger than 850 | 0.67 | 34 | 28 | 35 |
| Comparative Example 6 | No cooling | not larger than 850 | 0.67 | 37 | 21 | 26 |

The above is comparison of dry polymer (5).
(Comparative Example 6: much aggregation and adhesion/difficult continuous mixing)

(Note):
The values in the parentheses of the absorption capacities under the loads of Examples 10 to 13 are what they are after the impact resistance test.

As is understood from the data shown in Table 1, Examples 1 to 7 and 14 are included in the preferable scope of the present invention in which the water-absorbent resin powder has an average particle diameter of 200 to 600 μm after the pulverization step wherein the total ratio of particles having particle diameters of not larger than 150 μm and particles having particle diameters of not smaller than 850 μm in the water-absorbent resin powder is not more than 15 weight % of the water-absorbent resin powder. On the other hand, as to Comparative Examples 1 and 2, it would be understood that the average particle diameter of the water-absorbent resin powder deviates from the range of 200 to 600 μm and further that the total ratio of particles having particle diameters of not larger than 150 μm and particles having particle diameters of not smaller than 850 μm in the water-absorbent resin powder is more than 15 weight % of the water-absorbent resin powder.

In addition, as is understood from the results shown in Table 1, the on-sieve fractions (not smaller than 850 μm) deviating from the specified particle diameter range are very much less in Examples 1 to 5 according to the present invention in which the dry polymer is forcibly cooled preferably into the range of 85 to 35° C., more preferably 80 to 40° C., still more preferably 70 to 45° C., after the heat-drying step than in Comparative Examples 1 and 2 not according to the present invention in which the forcible cooling was not carried out, therefore the average particle diameter and the particle diameter distribution are excellent in the present invention.

In addition, as is understood from the results shown in Table 1, as to the present invention, the adhesion and clogging of the dry polymer to the metal gauze also decreases, and the drying efficiency (drying speed, uniformity) increases. In addition, it would also be understood that: the difference between the effects at 40° C. and at 60° C. is not large, and cooling to not lower than 60° C. is sufficient in consideration of the scale of the cooling facilities. In addition, although not described in the table, the water-absorbent resin powder according to the present invention shows the advantage of little aggregating after the pulverization.

As is understood from the results shown in Table 2, as to the present invention, the aqueous liquid is uniformly added, and the resultant properties are therefore excellent. In addition, from comparison among Examples 10 to 13, it would be understood that if the bulk density is not less than 0.65 g/ml after the pulverization, the absorption capacity under a load (especially 4.90 kPa) is also more enhanced. Incidentally, as is shown in the parentheses in the table, the absorption capacities under loads (1.93 kPa and 4.90 kPa) are little deteriorated by the impact, and the impact resistance and the liquid permeability are also excellent. From comparison among Examples 15 to 17, it would be understood that the temperature of the powder and the internal wall temperature of the mixer are important for the addition of the aqueous liquid.

Furthermore, the above working examples according to the present invention are compared with regard to a series of continuous procedures. The effects of the present invention are shown more remarkably when continuously carrying out the production, especially, when carrying out continuous drying and continuous pulverization of not less than 1 ton/day, preferably not less than 10 tons/day, of the water-absorbent resin powder per line and then adding the aqueous liquid.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a water-absorbent resin powder, which comprises the steps of:
   polymerizing an aqueous monomer solution containing a monomer and a crosslinking agent;
   heat-drying the resultant crosslinked hydrogel polymer; and
   pulverizing the resultant dry polymer to produce said water-absorbent resin powder;
   wherein:
   the dry polymer resultant from the heat-drying step is forcibly cooled before or during the pulverization step; and
   the water-absorbent resin powder has a weight-average particle diameter of 200 to 600 μm after the pulverization step wherein the total amount of particles of JIS 150-μm sieve-passed fractions and JIS 850-μm sieve-on fractions in the water-absorbent resin powder is not more than 15 weight % of the water-absorbent resin powder.

2. A production process for a water-absorbent resin powder according to claim 1, which further comprises the step of surface-crosslinking the water-absorbent resin powder after the pulverization step.

3. A production process for a water-absorbent resin powder according to claim 2, wherein:
   the temperature of the heat-drying step is in the range of 110 to 230° C.;
   the temperature of the forcible cooling step following the heat-drying step is in the range of 85 to 35° C.; and
   the temperature of the surface-crosslinking step following the pulverization step is in the range of 110 to 230° C.

4. A production process for a water-absorbent resin powder according to claim 1, wherein the dry polymer has a solid content of 93 to 97 weight %.

5. A production process for a water-absorbent resin powder according to claim 1, which further comprises the steps of forming a single layer or multiple layers of particles of the crosslinked hydrogel polymer having a thickness of 1 to 20 cm and then drying it.

6. A production process for a water-absorbent resin powder according to claim 1, which further comprises the step of recycling heat obtained by forcibly cooling the dry polymer.

7. A production process for a water-absorbent resin powder according to claim 1, wherein the water-absorbent resin powder has a bulk density, as measured by an apparatus according to JIS K-3362 of not less than 0.65 g/ml after the pulverization step.

8. A production process for a water-absorbent resin powder according to claim 1, which further comprises the step of forcibly heating or heat-retaining the resultant water-absorbent resin powder after the pulverization step.

9. A production process for a water-absorbent resin powder according to claim 1, which further comprises the step of adding an aqueous liquid to the water-absorbent resin powder obtained after the pulverization step following the forcible cooling step.

10. A production process for a water-absorbent resin powder, which comprises the steps of:
   polymerizing an aqueous monomer solution containing a crosslinking agent;
   heat-drying the resultant crosslinked hydrogel polymer; and
   pulverizing the resultant dry polymer;
   with the production process further comprising the steps of:
      forcibly cooling the dry polymer after the heat-drying step; and
      recycling the resultant heat in order to utilize it for forcible heating in a production process for a water-absorbent resin.

11. A production process for a water-absorbent resin powder, which comprises the steps of:
   polymerizing an aqueous monomer solution containing a monomer and a crosslinking agent;
   heat-drying the resultant crosslinked hydrogel polymer;
   pulverizing the resultant dry polymer; and
      adding an aqueous liquid to the resultant powder in a mixer;
   wherein:
      the temperature of the heat-drying step is in the range of 110 to 230° C.;
      the dry polymer is forcibly cooled into the range of 80 to 35° C. before the addition of the aqueous liquid; and
      the dry polymer is adjusted so as to have a bulk density, as measured by an apparatus according to JIS K-3362, of not less than 0.65 g/ml after the pulverization step.

12. A production process for a water-absorbent resin powder according to claim 11, wherein the forcible cooling of the dry polymer is carried out before the pulverization step.

13. A production process for a water-absorbent resin powder according to claim 11, wherein the aqueous liquid contains a crosslinking agent.

14. A production process for a water-absorbent resin powder according to claim 11, wherein the aqueous liquid is an aqueous polyhydric alcohol solution.

15. A production process for a water-absorbent resin powder according to claim 11, wherein the water-absorbent resin powder has a weight-average particle diameter of 200 to 600 μm wherein the total amount of particles of JIS 150-μm sieve-passed fractions and JIS 850-μm sieve-on fractions in the water-absorbent resin powder is not more than 15 weight % of the water-absorbent resin powder.

16. A production process for a water-absorbent resin powder, which comprises the steps of:
   polymerizing an aqueous monomer solution containing a monomer and a crosslinking agent;
   heat-drying the resultant crosslinked hydrogel polymer;
   pulverizing the resultant dry polymer; and
   adding an aqueous liquid to the resultant powder in a mixer;
   wherein:
      the temperature of the heat-drying step is in the range of 110 to 230° C.;
      the dry polymer is forcibly cooled into the range of 80 to 35° C. before the addition of the aqueous liquid;
      the mixer is a stirring mixer having an internal wall temperature of not lower than 40° C.; and
      the mixture resultant from the addition of the aqueous liquid is reheated into the range of 110 to 230°C.

17. A production process for a water-absorbent resin powder, which comprises the steps of:
   polymerizing an aqueous monomer solution containing a monomer and a crosslinking agent;
   heat-drying the resultant crosslinked hydrogel polymer; and
   pulverizing the resultant dry polymer;
   wherein:
      the dry polymer is forcibly cooled after the heat-drying step;
      the step of pulverizing the dry polymer is carried out so as to form a water-absorbent resin powder having a bulk density, as measured by an apparatus according to JIS K-3362, of not less than 0.65 g/ml; and
      the cooled water-absorbent resin powder is further surface-crosslinked.

18. A production process for a water-absorbent resin powder, which comprises the steps of:
   polymerizing an aqueous monomer solution containing a monomer and a crosslinking agent;
   heat-drying the resultant crosslinked hydrogel polymer; and pulverizing the resultant dry polymer;
wherein:
the dry polymer is forcibly cooled after the heat-drying step;
the step of pulverizing the dry polymer is carried out so as to form a water-absorbent resin powder having a bulk density, as measured by an apparatus according to JIS K-3362, of not less than 0.65 g/ml; and
an aqueous liquid is further added to the cooled water-absorbent resin powder in a stirring mixer having a heated internal wall.

19. A production process for a water-absorbent resin powder according to claim 1, wherein:
the crosslinked hydrogel polymer to be heat-dried is particulate; and
the forcible cooling step is carried out by passing a cooling gas through the dry polymer to cool the dry polymer.

20. A production process for a water-absorbent resin powder according to claim 19, wherein said cooling gas is at a temperature of not higher than 60° C.

21. A production process for a water-absorbent resin powder according to claim 17, wherein:
the crosslinked hydrogel polymer to be heat-dried is particulate; and
the forcible cooling step is carried out by passing a cooling gas through the dry polymer to cool the dry polymer.

22. A production process for a water-absorbent resin powder according to claim 21, wherein said cooling gas is at a temperature of not higher than 60° C.

23. A production process for a water-absorbent resin according to claim 18, wherein the aqueous liquid is an aqueous polyhydric alcohol solution.

24. A production process for a water-absorbent resin powder according to claim 18, which involves continuous drying, continuous pulverization and the subsequent continuous addition of the aqueous liquid on a large scale of not less than 1 ton/day of the water-absorbent resin powder per line.

25. A production process according to claim 1, wherein said water-absorbent resin powder exhibits an absorption capacity of not less than 25 g/g for 0.9 wt % physiological saline solution under a load (1.96 kPa) over 60 minutes.

26. A production process according to claim 10, wherein said water-absorbent resin powder exhibits an absorption capacity of not less than 25 g/g for 0.9 wt % physiological saline solution under a load (1.96 kPa) over 60 minutes.

27. A production process according to claim 11, wherein said water-absorbent resin powder exhibits an absorption capacity of not less than 25 g/g for 0.9 wt % physiological saline solution under a load (1.96 kPa) over 60 minutes.

28. A production process according to claim 16, wherein said water-absorbent resin powder exhibits an absorption capacity of not less than 25 g/g for 0.9 wt % physiological saline solution under a load (1.96 kPa) over 60 minutes.

29. A production process according to claim 17, wherein said water-absorbent resin powder exhibits an absorption capacity of not less than 25 g/g for 0.9 wt % physiological saline solution under a load (1.96 kPa) over 60 minutes.

* * * * *